United States Patent
Yokoyama et al.

(10) Patent No.: US 12,246,673 B2
(45) Date of Patent: Mar. 11, 2025

(54) SEAT BELT RETRACTOR

(71) Applicant: ASHIMORI INDUSTRY CO., LTD., Settsu (JP)

(72) Inventors: Taro Yokoyama, Settsu (JP); Satoshi Suminaka, Settsu (JP); Takayoshi Ijiri, Settsu (JP); Noriko Kurauchi, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 261 days.

(21) Appl. No.: 18/163,069

(22) Filed: Feb. 1, 2023

(65) Prior Publication Data
US 2023/0249643 A1      Aug. 10, 2023

(30) Foreign Application Priority Data

Feb. 4, 2022 (JP) ................................. 2022-016641

(51) Int. Cl.
*B60R 22/40* (2006.01)

(52) U.S. Cl.
CPC ........ *B60R 22/40* (2013.01); *B60R 2022/401* (2013.01)

(58) Field of Classification Search
CPC .. B60R 22/40; B60R 22/405; B60R 2022/401
See application file for complete search history.

(56) References Cited

U.S. PATENT DOCUMENTS

| | | | |
|---|---|---|---|
| 4,844,374 A | 7/1989 | Mori | |
| 6,299,093 B1 * | 10/2001 | Harte | B60R 22/405 |
| | | | 242/384.6 |
| 9,067,758 B2 * | 6/2015 | Ono | B60R 22/40 |
| 9,174,607 B2 * | 11/2015 | Hata | B60R 22/40 |
| 9,409,547 B2 * | 8/2016 | Baumgartner | B60R 22/48 |

FOREIGN PATENT DOCUMENTS

| | | |
|---|---|---|
| CN | 201856732 U | 6/2011 |
| DE | 10 2014 210 396 B4 | 5/2021 |
| JP | 63-114867 U | 7/1988 |
| JP | 5515180 B2 | 6/2014 |

* cited by examiner

*Primary Examiner* — Sang K Kim
(74) *Attorney, Agent, or Firm* — Sughrue Mion, PLLC

(57) ABSTRACT

A seat belt retractor includes a vehicle acceleration sensor. The vehicle acceleration sensor includes a sensor holder including a placement surface and an attachment member to which the sensor holder is coupled. The attachment member is attached to the housing in a state in which the sensor holder is in either a first posture or a second posture. The sensor holder is configured to be coupled to the attachment member at any one of a plurality of angular positions. The plurality of angular positions are positions of the sensor holder in a case where the sensor holder rotates around a rotation axis. A plurality of sensor attachment angles corresponding to the plurality of angular positions are different between the first posture and the second posture. The plurality of sensor attachment angles are angles, with respect to the housing, of the center line of the placement surface.

11 Claims, 17 Drawing Sheets

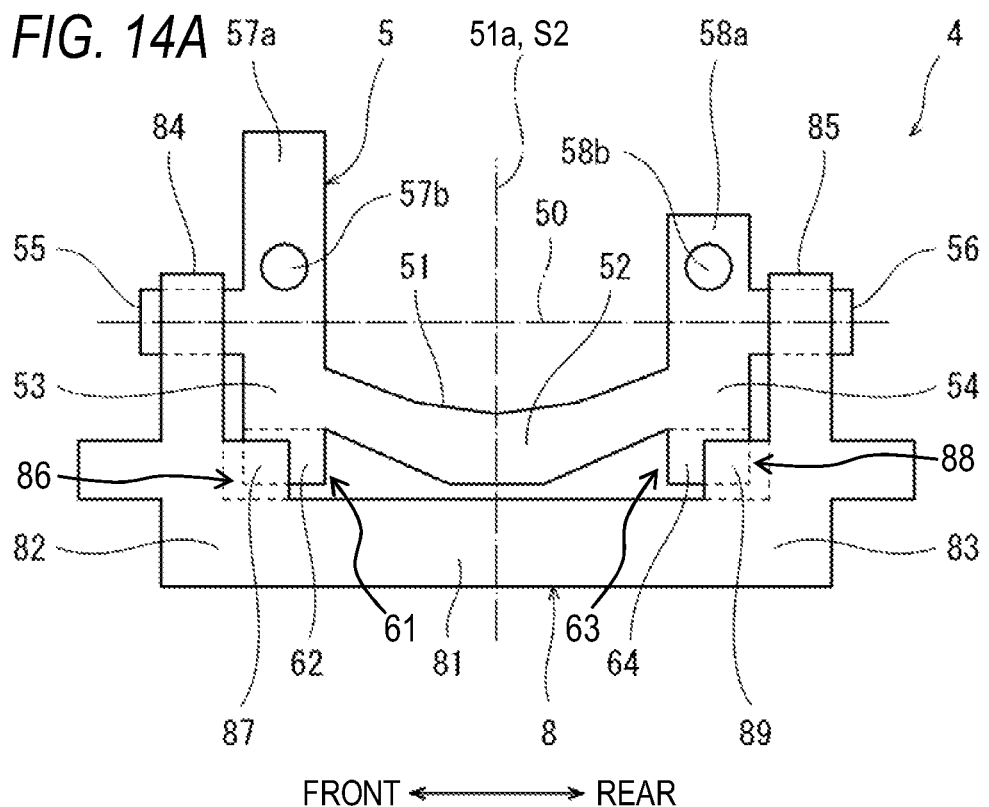
FIG. 14A
FRONT ←→ REAR
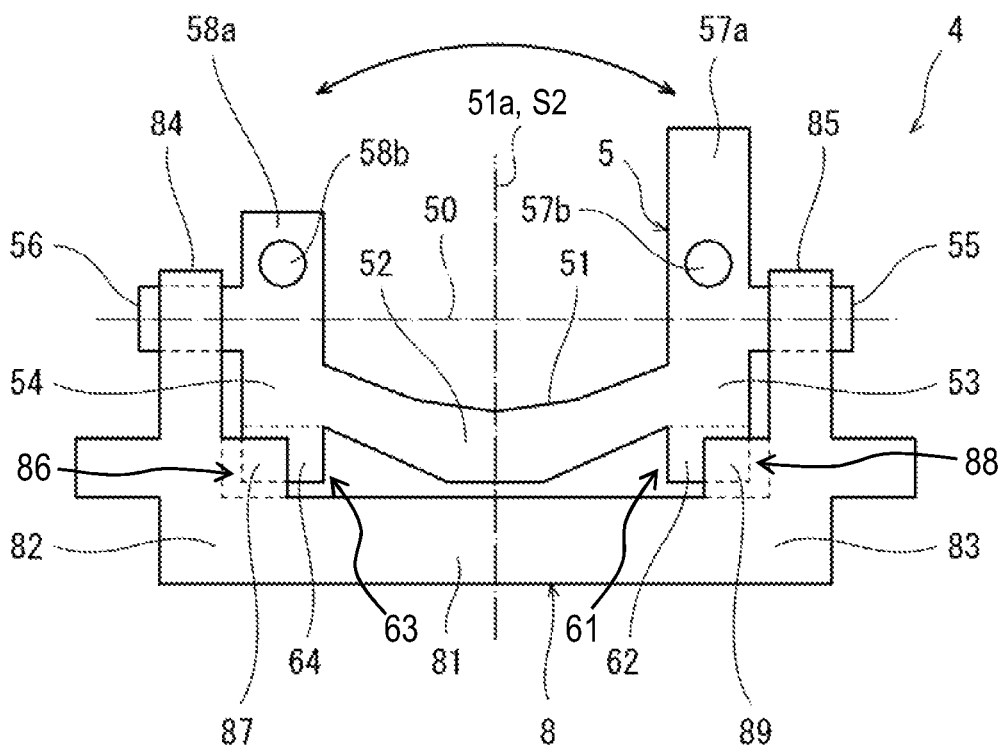
FIG. 14B   FRONT ←→ REAR

FRONT ←→ REAR

FIG. 15B   FRONT ←→ REAR

FRONT ←→ REAR

FRONT ←→ REAR

LEFT ⟵⟶ RIGHT

SEAT BELT RETRACTOR

CROSS-REFERENCE TO RELATED APPLICATIONS

This application is based on and claims priority under 35 USC § 119 from Japanese Patent Application No. 2022-016641 filed on Feb. 4, 2022, the contents of which are incorporated herein by reference.

TECHNICAL FIELD

The present disclosure relates to a seat belt retractor, mounted on a vehicle, for pulling out and winding a webbing as a seat belt.

BACKGROUND ART

In the related art, there has been known a seat belt retractor that includes a vehicle acceleration sensor configured to be in a detection state in a case where an acceleration of a vehicle is equal to or greater than a predetermined value, and prevents a webbing from being pulled out in a case where the vehicle acceleration sensor is in the detection state.

For example, CN201856732U discloses a seat belt retractor 100 shown in FIG. 19. The seat belt retractor 100 includes a housing 110 including a pair of side plates and a back plate, a winding drum 120 accommodated, between the side plates of the housing 110, to be rotatable in a pull-out direction and a winding direction of a webbing, and a vehicle acceleration sensor 130 attached to one of side plates of the housing 110.

The vehicle acceleration sensor 130 includes a spherical inertial mass body 140, a sensor holder 150 including a placement surface 151 on which the inertial mass body 140 is placed, and a sensor lever 160 swingably supported by the sensor holder 150. In a case where an acceleration of a vehicle is equal to or greater than a predetermined value, the sensor lever 160 is pushed up by the inertial mass body 140 rolling on the placement surface 151. Accordingly, the winding drum 120 is prevented from rotating in the pull-out direction of the webbing.

The vehicle acceleration sensor 130 further includes an attachment member 170 to which the sensor holder 150 is coupled and which is attached to one side plate of the housing 110.

The seat belt retractor may be mounted on a vehicle in a state in which the seat belt retractor is inclined in a front-rear direction and/or a width direction of the vehicle. The seat belt retractor 100 disclosed in CN201856732U is configured such that the placement surface 151 of the sensor holder 150 can be brought close to a horizontal plane even in a state in which an axial direction of the winding drum 120 is inclined with respect to the horizontal plane. That is, the inclination of the sensor holder 150 is adjusted along a plane parallel to the back plate of the housing 110.

Specifically, the sensor holder 150 can be coupled to the attachment member 170 at any one of a plurality of angular positions which are positions at which the sensor holder 150 rotates around a rotation axis 152 extending in a direction orthogonal to the back plate of the housing 110. The attachment member 170 is provided with a fixed-side engagement portion 171 including a plurality of engagement teeth arranged in a circumferential direction around the rotation axis 152, and the sensor holder 150 is provided with a movable-side engagement portion 153 that includes a plurality of engagement teeth arranged in the circumferential direction around the rotation axis 152 and is engageable with the fixed-side engagement portion 171. In accordance with a change of an engaged state between the movable-side engagement portion 153 and the fixed-side engagement portion 171, the sensor holder 150 is coupled to the attachment member 170 at any one of the plurality of angular positions.

Further, Japanese Patent No. 5515180 discloses a seat belt retractor 100 having an engagement structure similar to that of the seat belt retractor 100 described above and configured to cope with a state in which an axial direction of a winding drum is inclined with respect to a horizontal plane (a state in which the seat belt retractor is inclined in a width direction of a vehicle in Japanese Patent No. 5515180).

However, as in the seat belt retractor 100 of CN201856732U, in a case where the engagement portions 171 and 153 having a plurality of engagement teeth are engaged with each other, a sensor attachment angle, which is an angle of a center line of the placement surface 151 with respect to the housing 110, can be adjusted only by a pitch (an interval) of the engagement teeth. Therefore, in a case where it is desired to adjust the sensor attachment angle to an angle between pitches of the engagement teeth, it is necessary to prepare another sensor holder 150 in which the pitch of the engagement teeth is shifted.

SUMMARY OF INVENTION

An object of the present disclosure is to provide a seat belt retractor that can increase the number of sensor attachment angles adjusted by one sensor holder as compared with the related art.

In order to solve the above problem, the present disclosure provides a seat belt retractor including: a vehicle acceleration sensor configured to be in a detection state in a case where an acceleration of a vehicle is equal to or greater than a predetermined value; and a winding drum accommodated, in a housing, to be rotatable in a pull-out direction and a winding direction of a webbing, the winding drum being configured not to rotate in the pull-out direction in a case where the vehicle acceleration sensor is in the detection state, in which the vehicle acceleration sensor includes: an inertial mass body having a spherical shape; a sensor holder including a placement surface having a mortar shape and a cross-sectional shape symmetrical with respect to a center line of the placement surface, the inertial mass body being placed on the placement surface; a sensor lever swingably supported by the sensor holder, the sensor lever being pushed up by the inertial mass body rolling on the placement surface in a case where the acceleration of the vehicle is equal to or greater than the predetermined value; and an attachment member to which the sensor holder is coupled and which is attached to the housing, the attachment member is attached to the housing in a state in which the sensor holder is in either a first posture or a second posture inverted about the center line of the placement surface with respect to the first posture, the sensor holder is configured to be coupled to the attachment member at any one of a plurality of angular positions in each of the first posture and the second posture, the plurality of angular positions being positions of the sensor holder in a case where the sensor holder rotates around a rotation axis extending in a direction orthogonal to the center line of the placement surface, and a plurality of sensor attachment angles corresponding to the plurality of angular positions are different between the first posture and the second posture, the plurality of sensor attachment angles being angles, with respect to the housing, of the center line of the placement surface.

According to the above configuration, the sensor attachment angles are different between the state in which the sensor holder is in the first posture and the state in which the sensor holder is in the second posture, and thus it is possible to increase the number of the sensor attachment angles adjusted by one sensor holder as compared with the related art. Therefore, in a case where the sensor attachment angle is adjusted in a predetermined angle range, the number of sensor holders to be prepared can be reduced.

For example, the sensor holder may be provided with an outward engagement portion including at least one outward protrusion that is pointed radially outward about the rotation axis, the attachment member may be provided with an inward engagement portion including at least one inward protrusion that is pointed radially inward about the rotation axis, the inward engagement portion being configured to engage with the outward engagement portion, one or both of the at least one outward protrusion and the at least one inward protrusion may be provided in plural and arranged in a circumferential direction around the rotation axis, and the sensor holder may be configured to be coupled to the attachment member at any one of the plurality of angular positions in accordance with a change of an engaged state between the outward engagement portion and the inward engagement portion.

The sensor holder may be configured to be in either the first posture or the second posture by reversing an orientation of the sensor holder in a case where the sensor holder is coupled to the attachment member, and the outward engagement portion and the inward engagement portion may be configured to be engaged with each other in both the first posture and the second posture.

According to this configuration, it is possible to select whether the sensor holder is in the first posture or the second posture, depending on the orientation of the sensor holder in a case where the sensor holder is coupled to the attachment member.

The number of portions of the inward engagement portions may be one, the outward engagement portion may include a first outward engagement portion configured to be engaged with the inward engagement portion, in the first posture, and a second outward engagement portion configured to be engaged with the inward engagement portion, in the second posture, and the first outward engagement portion and the second outward engagement portion may be different in a position of the at least one outward protrusion when viewed from an extending direction of the rotation axis.

According to this configuration, the plurality of sensor attachment angles can be easily set, depending on a difference in position between the outward protrusion of the first outward engagement portion and the outward protrusion of the second outward engagement portion.

The number of portions of the outward engagement portions may be one, the inward engagement portion may include a first inward engagement portion configured to be engaged with the outward engagement portion, in the first posture, and a second inward engagement portion configured to be engaged with the outward engagement portion, in the second posture, and the first inward engagement portion and the second inward engagement portion may be different in a position of the at least one inward protrusion when viewed from an extending direction of the rotation axis.

According to this configuration, the plurality of sensor attachment angles can be easily set, depending on a difference in position between the inward protrusion of the first inward engagement portion and the inward protrusion of the second inward engagement portion.

The inward engagement portion may include a first inward engagement portion and a second inward engagement portion, the outward engagement portion may include a first outward engagement portion and a second outward engagement portion, the first outward engagement portion is configured: to be engaged with the first inward engagement portion, in the first posture; not to be engaged with the second inward engagement portion, in the first posture; and not to be engaged with the first inward engagement portion and the second inward engagement portion, in the second posture, and a second outward engagement portion is configured: not to be engaged with the first inward engagement portion and the second inward engagement portion, in the first posture; to be engaged with the second inward engagement portion, in the second posture; and not to be engaged with the first inward engagement portion, in the second posture.

According to this configuration, an engagement structure of the first inward engagement portion and the first outward engagement portion, and an engagement structure of the second inward engagement portion and the second outward engagement portion can be made different from each other.

By reversing an orientation of the attachment member with respect to the housing, the attachment member may be configured to be attached to the housing either in a state in which the sensor holder is in the first posture or in a state in which the sensor holder is in the second posture.

According to this configuration, it is possible to select whether the sensor holder is in the first posture or the second posture, depending on the orientation of the attachment member attached to the housing.

The outward engagement portion may be asymmetric with respect to a plane including the rotation axis and the center line of the placement surface.

According to this configuration, the attachment member can have a symmetrical simple shape.

The sensor holder may include: a first support portion configured to swingably support the sensor lever in the first posture; and a second support portion configured to swingably support the sensor lever in the second posture, the second support portion being located on a side opposite to the first support portion with respect to the center line of the placement surface.

According to this configuration, the sensor lever in the first posture and the sensor lever in the second posture can be designed in the same direction.

A shape of the sensor holder may be asymmetric with respect to a plane that is perpendicular to a direction in which the first support portion and the second support portion are separated from each other, and that includes the center line of the placement surface.

According to this configuration, it is possible to determine whether the sensor holder is in the first posture or the second posture only by looking at the sensor holder.

The first support portion of the sensor holder and the second support portion of the sensor holder have different heights, in a direction along the center line of the placement surface, from the placement surface.

According to this configuration, it is possible to easily determine whether the sensor holder is in the first posture or the second posture.

According to the present disclosure, it is possible to increase the number of sensor attachment angles adjusted by one sensor holder as compared with the related art.

BRIEF DESCRIPTION OF DRAWINGS

FIG. 14A schematically shows a state before reversing the sensor holder in the vehicle acceleration sensor used in the embodiment.

FIG. 14B schematically shows a state after reversing the sensor holder in the vehicle acceleration sensor used in the embodiment.

FIG. 15B schematically shows a state after reversing the sensor holder in a vehicle acceleration sensor according to the first modification.

DESCRIPTION OF EMBODIMENTS

Figure 1:
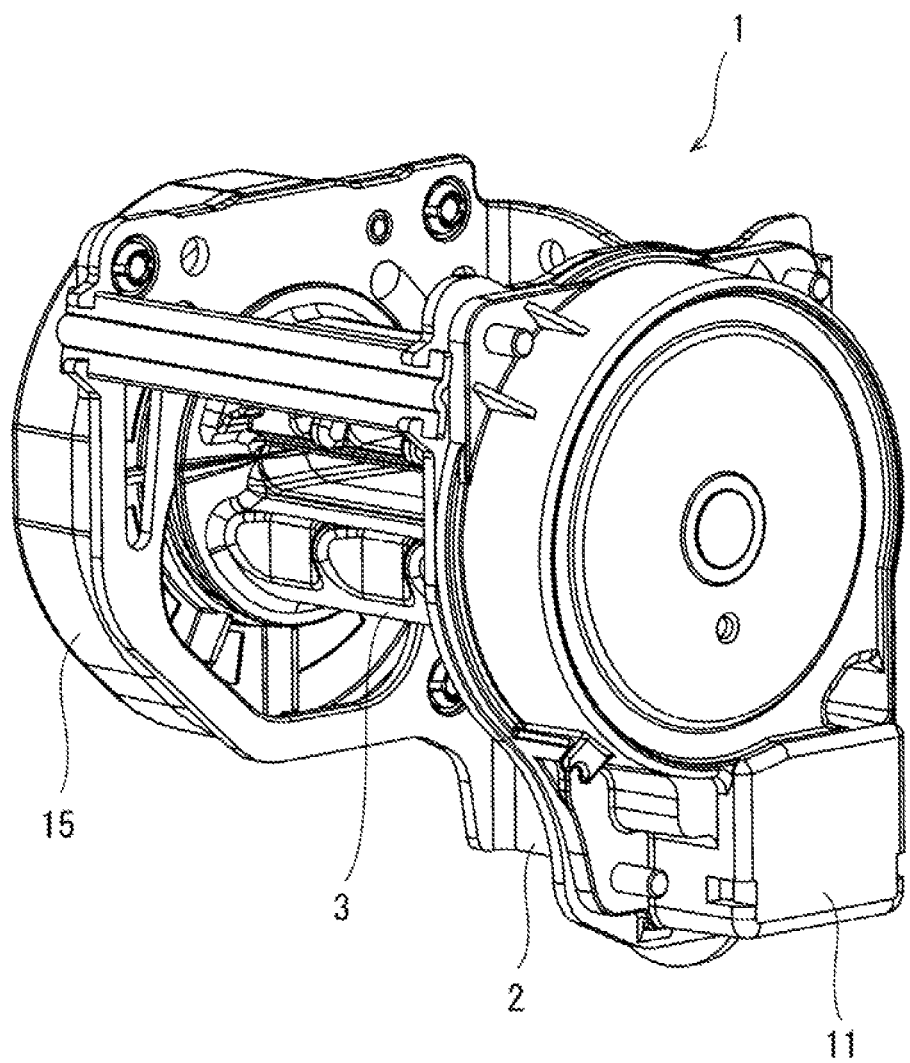
FIG. 1 is a perspective view of a seat belt retractor according to an embodiment of the present disclosure.
Figure 2:
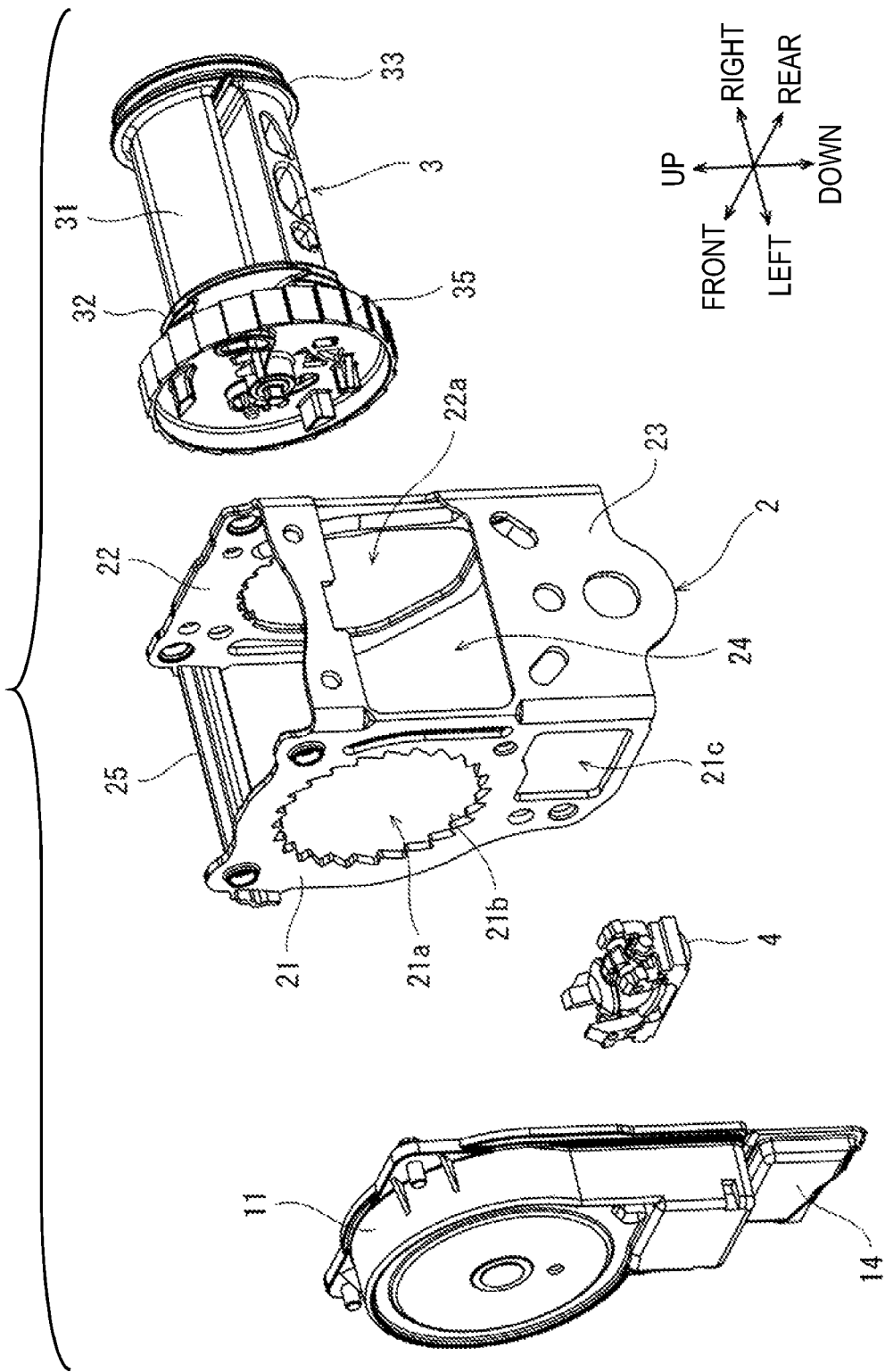
FIG. 2 is an exploded perspective view of the seat belt retractor shown in FIG. 1 as viewed from one side.
Figure 3:
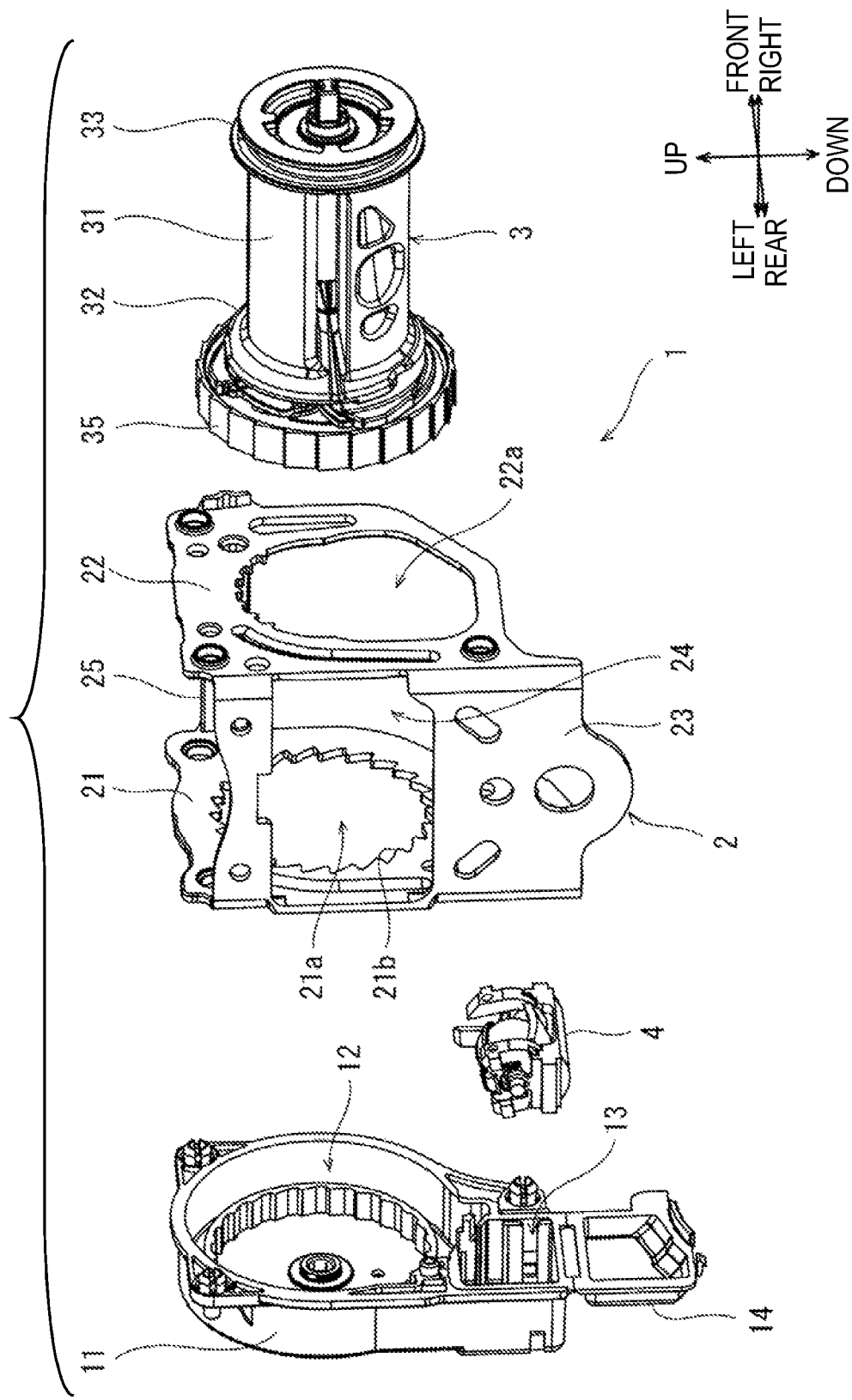
FIG. 3 is an exploded perspective view of the seat belt retractor shown in FIG. 1 as viewed from the other side.

FIGS. 1 to 3 show a seat belt retractor 1 according to an embodiment of the present disclosure. The seat belt retractor 1 is mounted on a vehicle, and pulls out and winds a webbing as a seat belt.

Specifically, the seat belt retractor 1 includes a housing 2 including a pair of side plates 21 and 22 and a back plate 23, a winding drum 3 accommodated, between the side plates 21 and 22 of the housing 2, to be rotatable in a pull-out direction and a winding direction of the webbing, and a vehicle acceleration sensor 4 attached to one side plate 21 of the housing 2.

The side plates 21 and 22 of the housing 2 face each other in an axial direction of the winding drum 3, and the back plate 23 is parallel to the axial direction of the winding drum 3. Hereinafter, for convenience of explanation, the axial direction of the winding drum 3 is referred to as the left-right direction, and a thickness direction of the back plate 23 is referred to as the front-rear direction. A side of the side plates 21 and 22 is referred to as the front, and a side opposite to the side plates 21 and 22 is referred to as the rear. As shown in FIG. 1, one side of a direction orthogonal to the left-right direction and the front-rear direction is referred to as an upper side, and the other side of the direction orthogonal to the left-right direction and the front-rear direction is referred to as a lower side.

Upper portions of front sides of the side plates 21 and 22 of the housing 2 are connected to each other by a connecting bar 25. The side plates 21 and 22 are respectively provided with openings 21a and 22a through which the winding drum 3 is inserted. The back plate 23 is provided with an opening 24 through which the winding drum 3 is exposed.

A mechanism cover 11 is attached to the side plate 21 of the housing 2, and a winding spring unit 15, which is not shown in FIGS. 2 and 3, is attached to the side plate 22 of the housing 2. The mechanism cover 11 and the winding spring unit 15 is configured to rotatably support the winding drum 3. Since a configuration of the winding spring unit 15 is known, a detailed description of the winding spring unit 15 will be omitted.

The winding drum 3 includes a substantially cylindrical drum body 31 and substantially disc-shaped end portions 32 and 33 having a larger diameter than the drum body 31. The end portion 32 is a portion fitted into the opening 21a of the side plate 21 of the housing 2, and the end portion 33 is a portion fitted into the opening 22a of the side plate 22 of the housing 2.

Internal teeth 21b are formed on a peripheral edge of the opening 21a of the side plate 21 of the housing 2. Although not shown, a pawl configured to engage with the internal teeth 21b is held in the end portion 32 of the winding drum 3. A clutch 35 for operating the pawl is attached to the end portion 32.

The clutch 35 has a substantially disc shape having a larger diameter than the end portion 32 of the winding drum 3, and external teeth configured to engage with the vehicle acceleration sensor 4 are formed on an outer peripheral surface of the clutch 35. The clutch 35 is configured to normally rotate integrally with the winding drum 3, and in an emergency, the clutch 35 is configured to be prevented from rotating and configured to rotate relative to the winding drum 3.

The side plate 21 of the housing 2 is also provided with an opening 21c for avoiding interference with the vehicle acceleration sensor 4 (more precisely, a sensor cover 14 to be described later) below the opening 21a. In the present embodiment, the vehicle acceleration sensor 4 is attached to the side plate 21 via the mechanism cover 11.

The mechanism cover 11 is formed with a first accommodation chamber 12 configured to accommodate the clutch 35 and a second accommodation chamber 13 configured to accommodate most of the vehicle acceleration sensor 4. Further, the sensor cover 14 is attached to the mechanism cover 11 via a hinge. The sensor cover 14 is configured to cover the vehicle acceleration sensor 4 after the vehicle acceleration sensor 4 is inserted into the second accommodation chamber 13.

The vehicle acceleration sensor 4 is configured to be in a detection state in a case where an acceleration of the vehicle is equal to or greater than a predetermined value. In a case where the vehicle acceleration sensor 4 is in the detection state, an engagement claw 74 of a sensor lever 7A, 7B, or 7C to be described later is engaged with the external teeth of the clutch 35. Accordingly, the clutch 35 is prevented from rotating in the pull-out direction of the webbing, and the winding drum 3 rotates relative to the clutch 35. By the relative rotation, the pawl comes out from the end portion 32 of the winding drum 3 to engage with the internal teeth 21b, and the winding drum 3 is prevented from rotating in the pull-out direction of the webbing.

The structure for preventing the winding drum 3 from rotating in the pull-out direction of the webbing is not limited to the present embodiment, and can be changed as appropriate. For example, although not shown, the pawl may be swingably attached to the side plate 21 of the housing 2 instead of the end portion 32 of the winding drum 3, and a gear configured to engage with the pawl may be attached to the winding drum 3 instead of the internal teeth 21b of the side plate 21 of the housing 2.

Next, a structure of the vehicle acceleration sensor 4 will be described with reference to FIGS. 4 to 111B. The vehicle acceleration sensor 4 includes a spherical inertial mass body 41, a sensor holder 5 having a placement surface 51 on which the inertial mass body 41 is placed, and the sensor lever 7A swingably supported by the sensor holder 5. In a case where the vehicle acceleration sensor 4 is in the detection state, the sensor lever 7A is pushed up by the inertial mass body 41 rolling on the placement surface 51. The vehicle acceleration sensor 4 includes an attachment member 8 to which the sensor holder 5 is coupled and which is attached to the side plate 21 of the housing 2 via the mechanism cover it.

Figure 8:
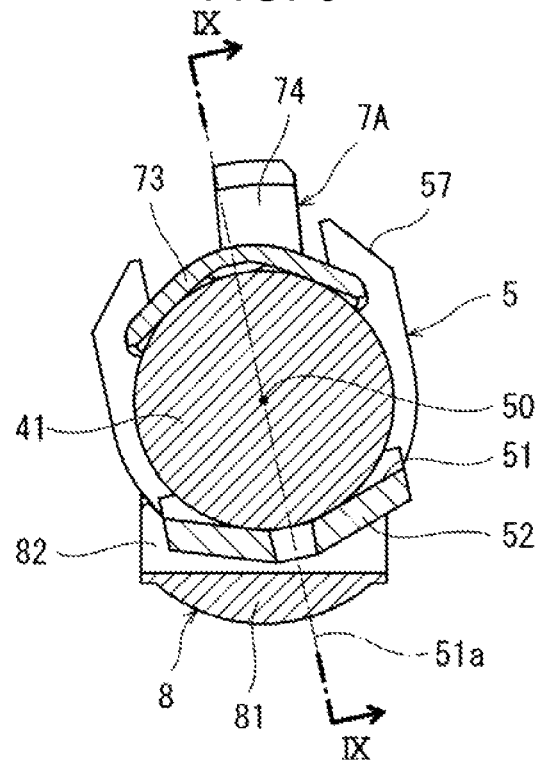
FIG. 8 is a cross-sectional view taken along a line VIII-VII in FIG. 4.
Figure 9:
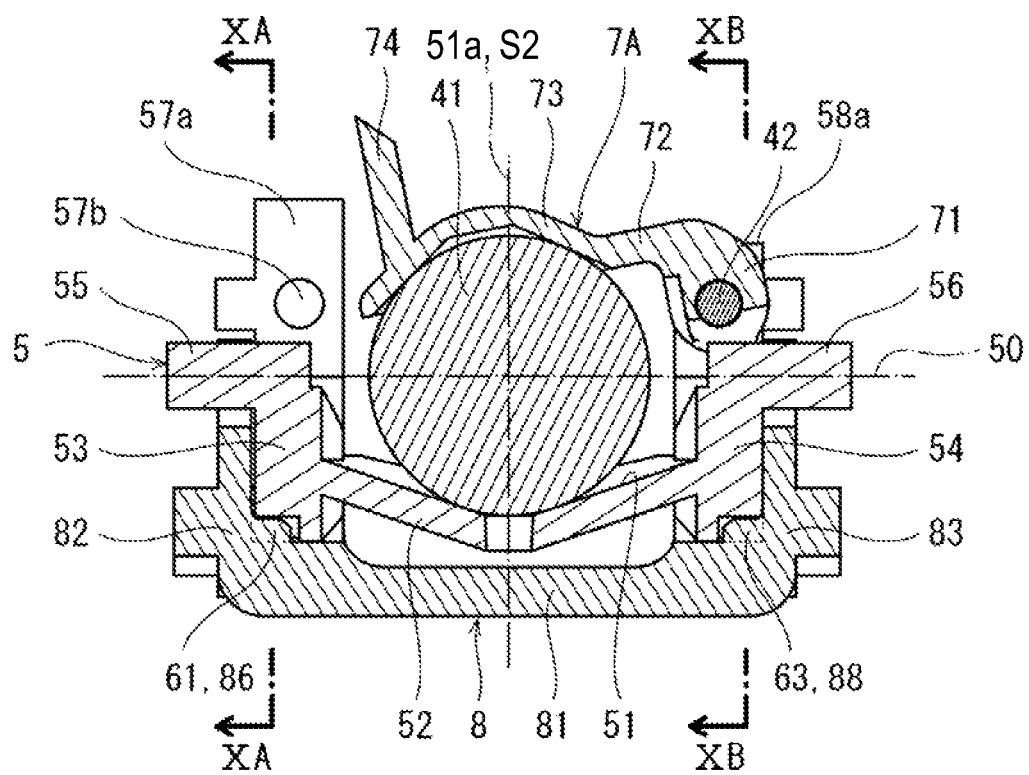
FIG. 9 is a cross-sectional view taken along a line IX-IX in FIG. 8.

As shown in FIGS. 8 and 9, the placement surface 51 of the sensor holder 5 has a mortar shape having a cross-sectional shape symmetrical with respect to a center line 51a of the placement surface 51. The cross-sectional shape of the placement surface 51 may be a straight line or a curved line. In addition, the cross-sectional shape of the placement surface 51 may be the same in a cross section in any direction, that is, spherically symmetrical, or may be different between a cross section in the front-rear direction and a cross section in the left-right direction.

In the present embodiment, the vehicle acceleration sensor 4 is configured to cope with a state in which the axial direction of the winding drum 3 is inclined with respect to a horizontal plane. That is, the inclination of the sensor holder 5, that is, inclination of the center line 51a of the placement surface 51, is adjusted along a plane parallel to the back plate 23 of the housing 2.

Figure 4:
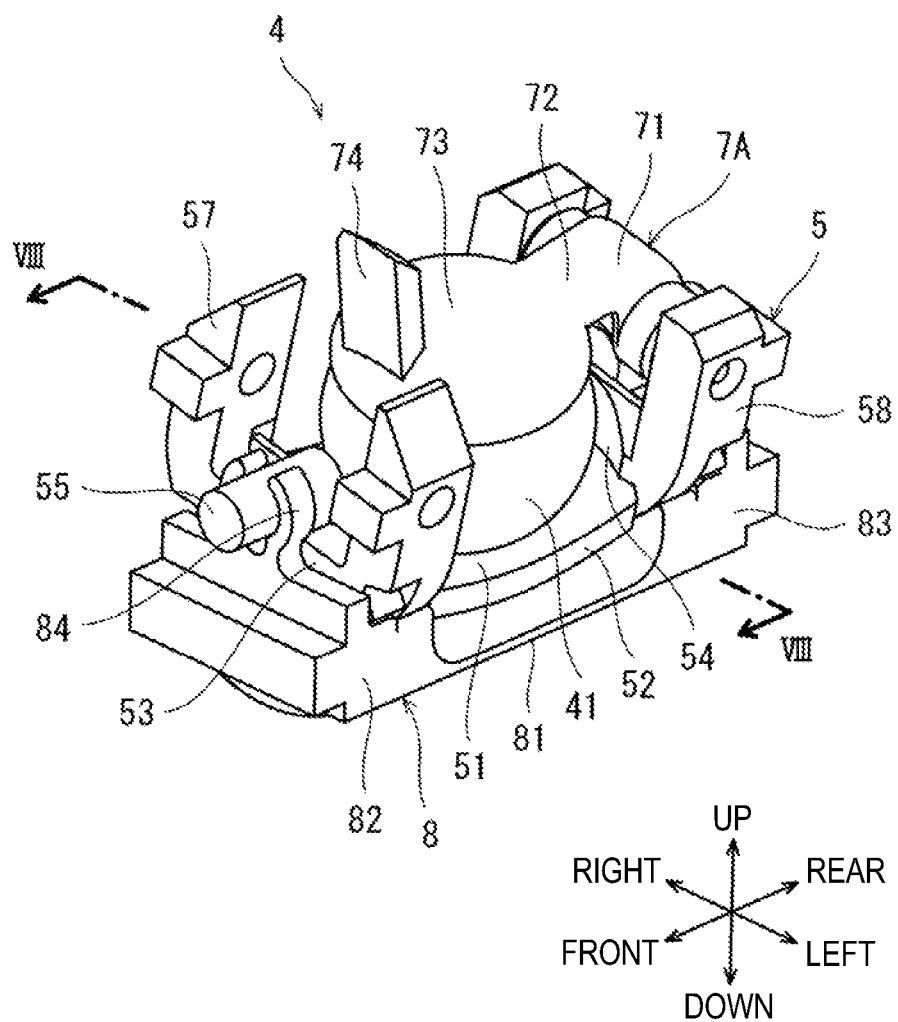
FIG. 4 is a perspective view of a vehicle acceleration sensor in a state in which a sensor holder is coupled to an attachment member at a reference angular position.
Figure 11A:
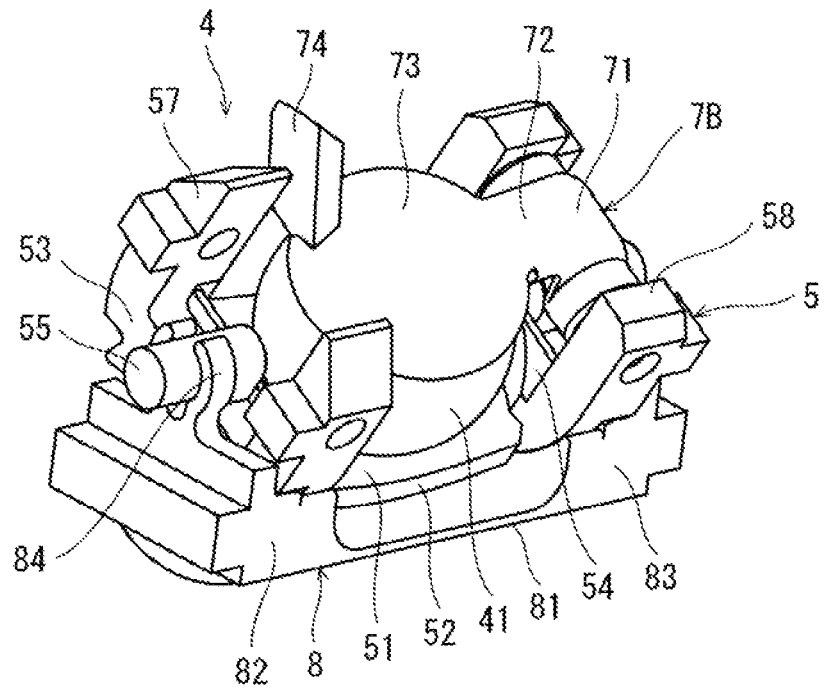
FIG. 11A is a perspective view of a vehicle acceleration sensor in a state in which a sensor holder is coupled to an attachment member at an angular position adjacent to the reference angular position.
Figure 12A:
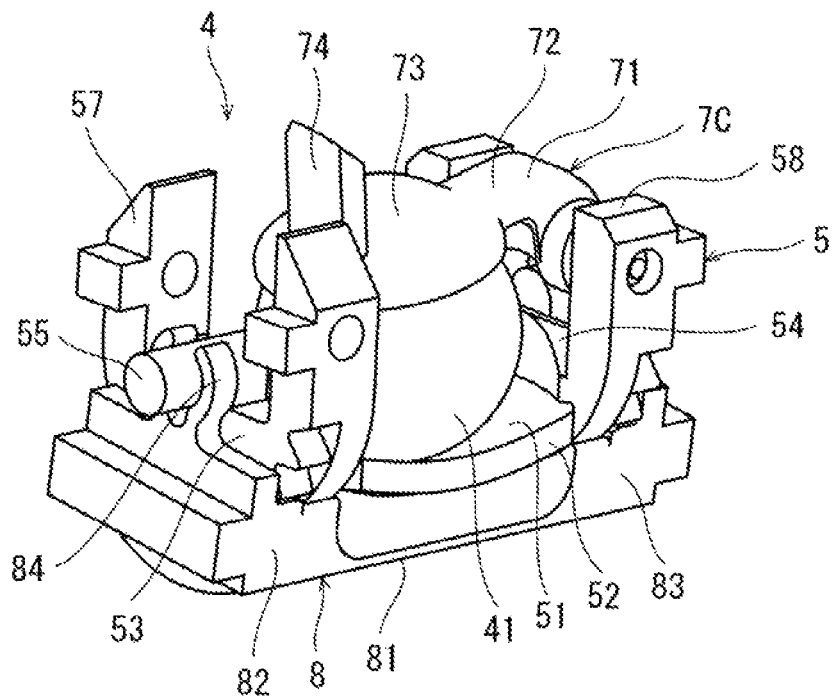
FIG. 12A is a perspective view of a vehicle acceleration sensor in a state in which a sensor holder is coupled to an attachment member at an angular position adjacent to the reference angular position (opposite to FIG. 11A).
Figure 13A:
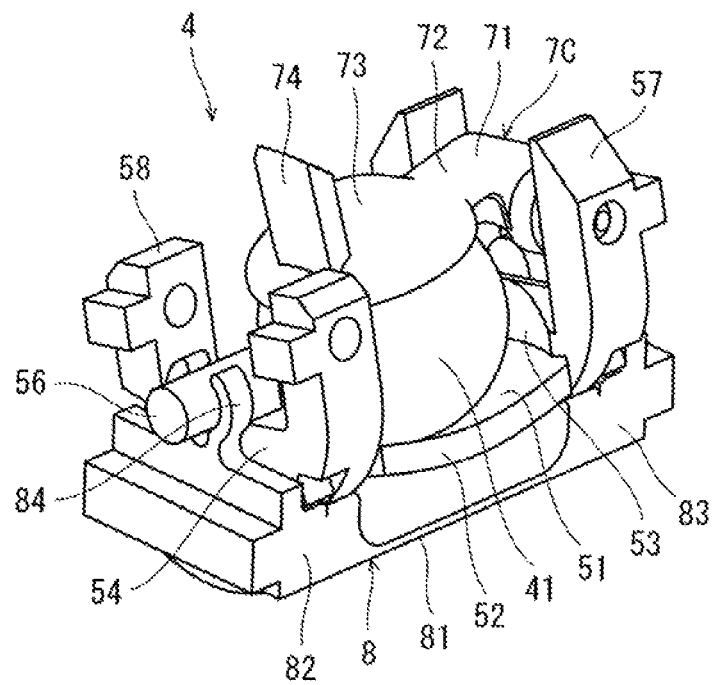
FIG. 13A is a perspective view of a vehicle acceleration sensor in a state in which a sensor holder whose orientation is inverted with respect to an attachment member is coupled to the attachment member at the reference angular position.

Further, in the present embodiment, the attachment member 8 is attached to the housing 2 in a state in which the sensor holder 5 is in either a first posture shown in FIGS. 4, 11A, and 12A or a second posture shown in FIG. 13A. The second posture is a posture inverted about the center line 51a of the placement surface 51 with respect to the first posture. In the present embodiment, by reversing an orientation of the sensor holder 5 coupled to the attachment member 8, the sensor holder 5 is in either the first orientation or the second orientation.

Figure 5:
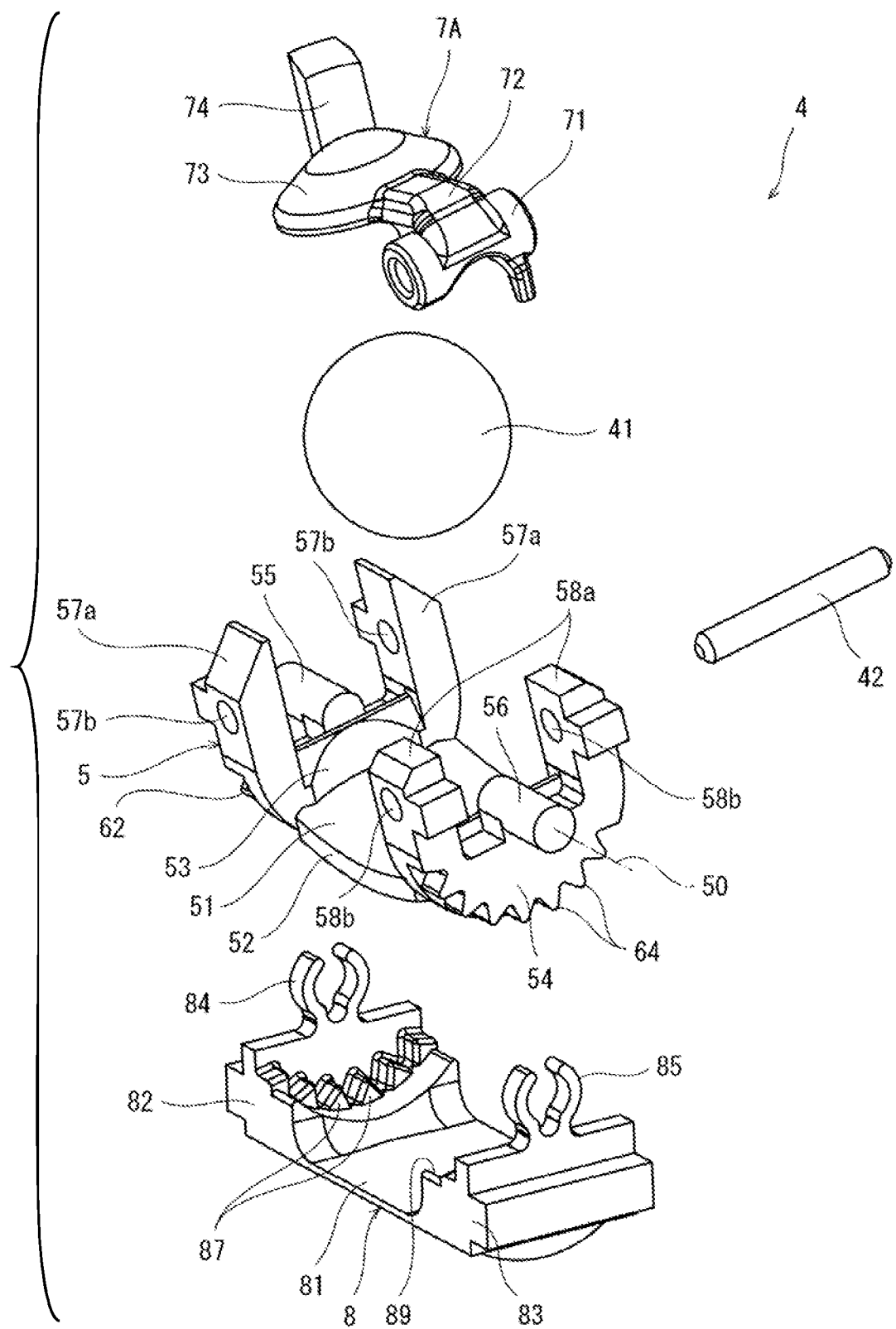
FIG. 5 is an exploded perspective view of the vehicle acceleration sensor shown in FIG. 4.
Figure 6:
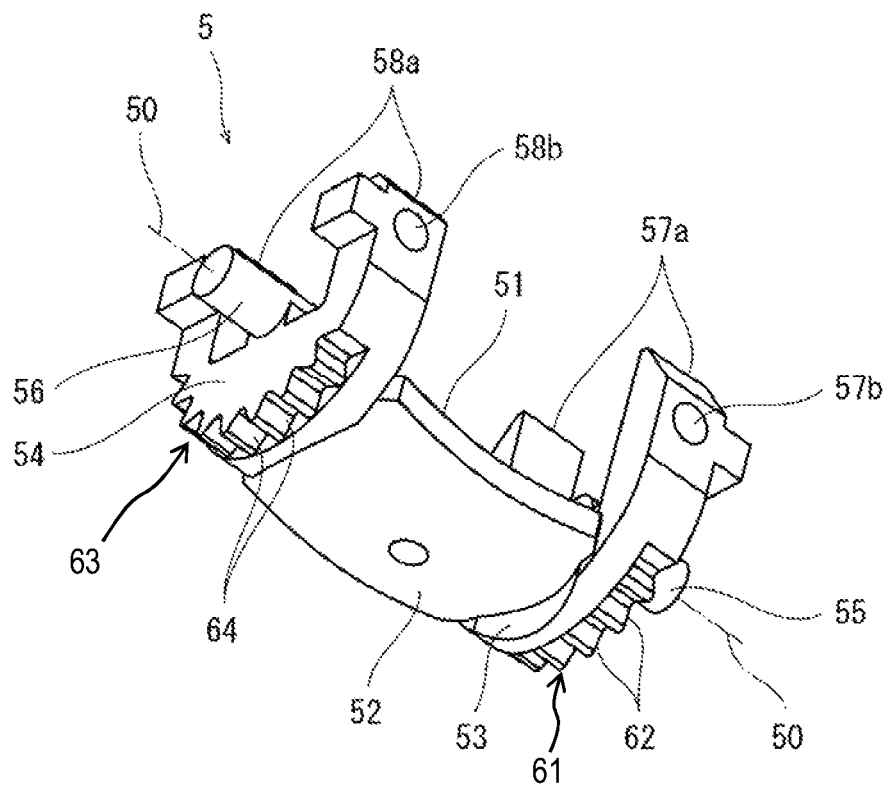
FIG. 6 is a perspective view of the sensor holder.

More specifically, as shown in FIGS. 5 and 6, the sensor holder 5 includes a plate-shaped support portion 52 having an upper surface configuring the placement surface 51, and a first side wall 53 and a second side wall 54 located on both sides of the support portion 52 in the front-rear direction.

Figure 7:
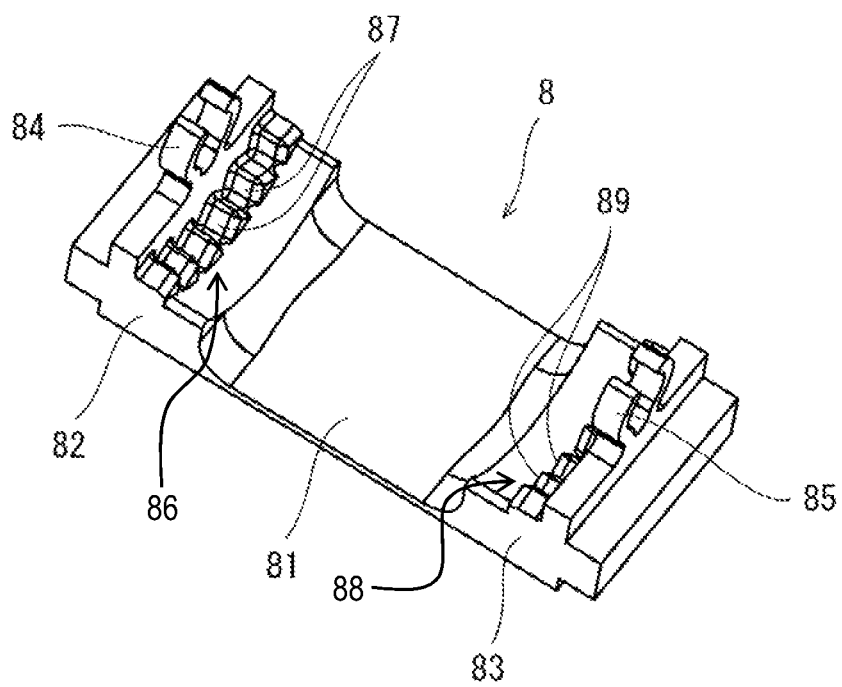
FIG. 7 is a perspective view of the attachment member.

As shown in FIGS. 5 and 7, the attachment member 8 includes a base 81 that faces the support portion 52 of the sensor holder 5 and that has a flat upper surface orthogonal to the up-down direction, and a first end portion 82 and a second end portion 83 that are located on both sides of the base 81 in the front-rear direction and that project upward from the base 81.

In each of the first posture and the second posture, the sensor holder 5 is configured to be coupled to the attachment member 8 at any one of a plurality of angular positions which are positions at which the sensor holder 5 rotates around a rotation axis 50 extending in the front-rear direction. As described above, since the inclination of the sensor holder 5, that is, the inclination of the center line 51a of the placement surface 51 with respect to the side plate 21 of the housing 2 is adjusted along the plane parallel to the back plate 23 of the housing 2, the front-rear direction is also a direction orthogonal to the center line 51a of the placement surface 51.

Figure 10A:
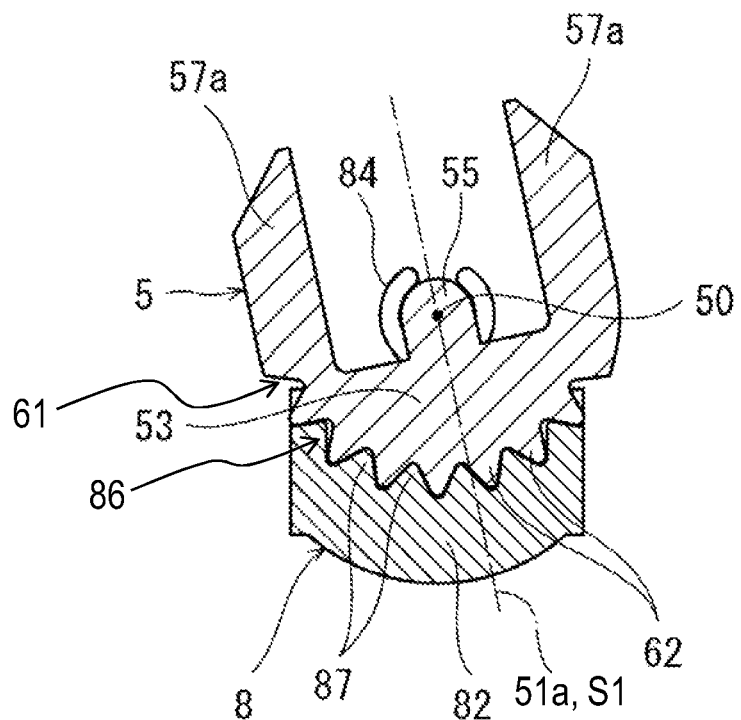
FIG. 10A is a cross-sectional view taken along lines XA-XA shown in FIG. 9.
Figure 10B:
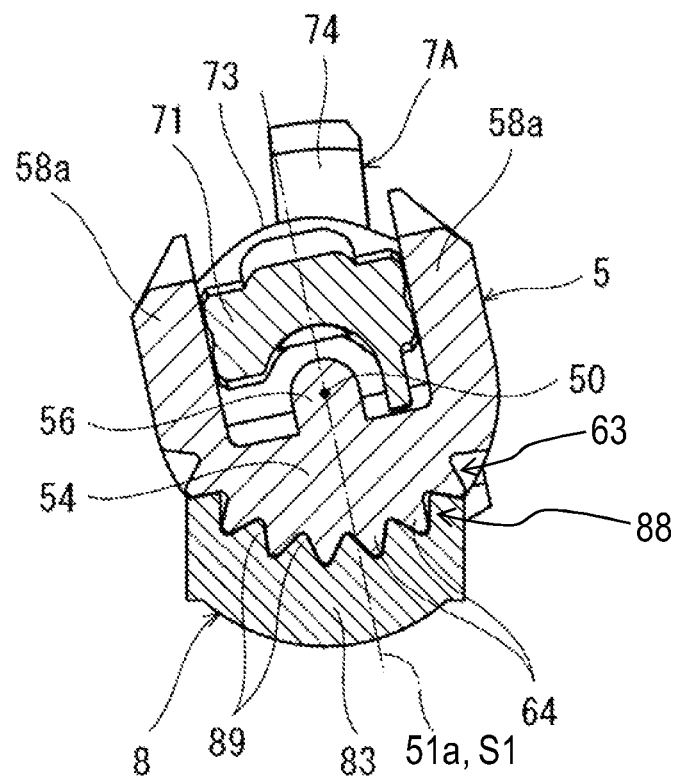
FIG. 10B is a cross-sectional view taken along lines XB-XB shown in FIG. 9.

In the present embodiment, as shown in FIGS. 9, 10A, and 10B, the sensor holder 5 is provided with a first outward engagement portion 61 and a second outward engagement portion 63, and the attachment member 8 is provided with a first inward engagement portion 86 and a second inward engagement portion 88. The first inward engagement portion 86 and the second inward engagement portion 88 are configured to engage with the first outward engagement portion 61 and the second outward engagement portion 63. The first outward engagement portion 61 is provided on the first side wall 53 of the sensor holder 5, and the second outward engagement portion 63 is provided on the second side wall 54 of the sensor holder 5. The first inward engagement portion 86 is provided in the first end portion 82 of the attachment member 8, and the second inward engagement portion 88 is provided in the second end portion 83 of the attachment member 8.

FIGS. 14A and 14B schematically show states before and after reversing the sensor holder. As shown in FIG. 14A, in the first posture, the first outward engagement portion 61 is engaged with the first inward engagement portion 86, and the second outward engagement portion 63 is engaged with the second inward engagement portion 88. As shown in FIG. 14B, in the second posture, the first outward engagement portion 61 is engaged with the second inward engagement portion 88, and the second outward engagement portion 63 is engaged with the first inward engagement portion 86.

The first side wall 53 and the second side wall 54 of the sensor holder 5 are respectively provided with shaft portions 55 and 56 centered on the rotation axis 50, and the first end portion 82 and the second end portion 83 of the attachment member 8 are respectively provided with grip portions 84 and 85. The shaft portions 55 and 56 protrude, in directions opposite to each other, from the first side wall 53 and the second side wall 54, respectively. In a case where the shaft portions 55 and 56 are gripped by the grip portions 84 and 85, a state in which the sensor holder 5 is coupled to the attachment member 8, that is, a state in which the outward engagement portions 61 and 63 are engaged with the inward engagement portions 86 and 88, is maintained.

As shown in FIG. 10A, the first outward engagement portion 61 includes at least one outward protrusion 62 that is pointed radially outward about the rotation axis 50. Similarly, as shown in FIG. 10B, the second outward engagement portion 63 includes at least one outward protrusion 64 that is pointed radially outward about the rotation axis 50. In the present embodiment, a plurality of (seven in the illustrated example) outward protrusions 62 are provided side by side in a circumferential direction around the rotation axis 50, and a plurality of (seven in the illustrated example) outward protrusions 64 are provided side by side in the circumferential direction around the rotation axis 50.

On the other hand, as shown in FIG. 10A, the first inward engagement portion 86 includes at least one inward protrusion 87 that is pointed radially inward about the rotation axis 50. Similarly, as shown in FIG. 10B, the second inward engagement portion 88 includes at least one inward protrusion 89 that is pointed radially inward about the rotation axis 50. In the present embodiment, a plurality of (six in the illustrated example) inward protrusions 87 are provided side by side in the circumferential direction around the rotation axis 50, and a plurality of (six in the illustrated example) inward protrusions 89 are provided side by side in the circumferential direction around the rotation axis 50.

In the present embodiment, a pitch of the outward protrusions 62 and 64, and a pitch of the inward protrusions 87 and 89 are 18 degrees. The number of either the outward protrusions 62 and 64, or the inward protrusions 87 and 89 may be one.

In the first posture, the sensor holder 5 is coupled to the attachment member 8 at any one of the plurality of angular positions, in accordance with a change of an engaged state between the first outward engagement portion 61 and the first inward engagement portion 86, and an engaged state between the second outward engagement portion 63 and the second inward engagement portion 88. Similarly, in the second posture, the sensor holder 5 is coupled to the attachment member 8 at any one of the plurality of angular positions, in accordance with a change of an engaged state between the first outward engagement portion 61 and the second inward engagement portion 88, and an engaged state between the second outward engagement portion 63 and the first inward engagement portion 86. That is, an angular difference between adjacent angular positions is equal to the pitch of the outward protrusions 62 and 64, and the pitch of the inward protrusions 87 and 89.

Figure 11B:
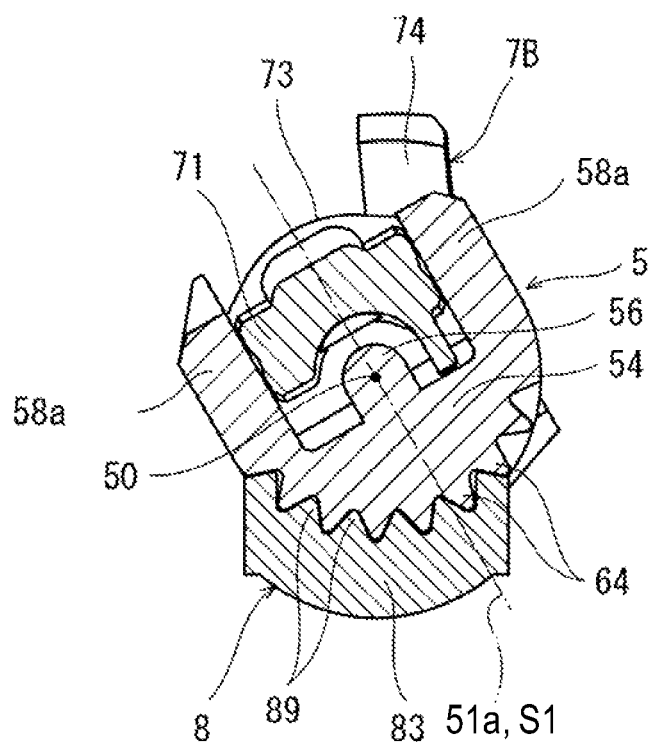
FIG. 11B is a cross-sectional view showing an engaged state between an inward engagement portion and an outward engagement portion in a state in which a sensor holder is coupled to the attachment member at the angular position adjacent to the reference angular position.
Figure 12B:
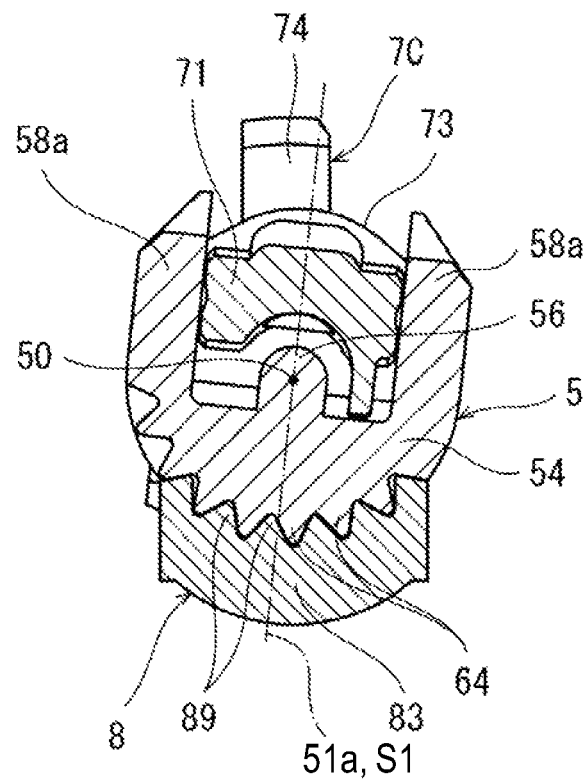
FIG. 12B is a cross-sectional view showing an engaged state between an inward engagement portion and an outward engagement portion in a state in which the sensor holder is coupled to the attachment member at the angular position adjacent to the reference angular position (opposite to FIG. 11A).

As described above, in the present embodiment, the number of the outward protrusions 62 and 64 is seven, and the number of the inward protrusions 87 and 89 is six, and thus the number of angular positions of the first posture and the number of angular positions of the second posture are three in total, that is, a reference angular position and two angular positions on both sides of the reference angular position. At a reference angular position in the first posture, as shown in FIGS. 10A and 10B, both ends of the outward protrusions 62 and 64 of the outward protrusions 62 and 64 are located outside the inward protrusions 87 and 89. At an angular position adjacent to the reference angular position in the first posture, as shown in FIGS. 11B and 12B, two outward protrusions 62 and 64 from the ends of the outward protrusions 62 and 64 are located outside the inward protrusions 87 and 89. The same applies to a reference angular position and an angular position adjacent to the reference angular position in the second posture.

In the present embodiment, as shown in FIGS. 10A and 10B, each of the first outward engagement portion 61 and the second outward engagement portion 63 is asymmetric with respect to a plane S1 including the rotation axis 50 and the center line 51a of the placement surface 51. Therefore, a plurality of sensor attachment angles, which are angles of the center line 51a of the placement surface 51 with respect to the housing 2, corresponding to the plurality of angular positions are different between the first posture and the second posture.

In a case where the number of the outward protrusions 62 and 64 is an odd number, the asymmetry described above is synonymous with the fact that apexes of the outward protrusions 62 and 64 at the center are not located on the plane S1 including the rotation axis 50 and the center line 51a of the placement surface 51. In a case where the number of the outward protrusions 62 and 64 is an even number, the asymmetry is synonymous with the fact that the bottom of a groove formed between two outward protrusions 62 and 64 at the center is not located on the plane S1 including the rotation axis 50 and the center line 51a of the placement surface 51.

In the present embodiment, the sensor attachment angle is defined as zero degrees in a case where the center line 51a of the placement surface 51 is parallel to the side plate 21, defined as positive in a direction in which the center line 51a of the placement surface 51 falls inward from the side plate 21, and defined as negative in a direction in which the center line 51a of the placement surface 51 falls outward from the side plate 21. That is, in the present embodiment, the sensor attachment angle is an angle of the center line 51a of the placement surface 51 with respect to the side plate 21 of the housing 2.

In the first posture, the sensor attachment angle is −12 degrees at the reference angular position shown in FIGS. 4, 10A, and 11B, −30 degrees at the adjacent angular position shown in FIGS. 11A and 11B, and 6 degrees at an angular position opposite to the adjacent angular position shown in FIGS. 12A and 12B. On the other hand, in the second posture, the sensor attachment angle is 12 degrees at a reference angular position shown in FIGS. 13A and 13B, −6 degrees at an adjacent angular position, and 30 degrees at an angular position opposite to the adjacent angular position.

Figure 13B:
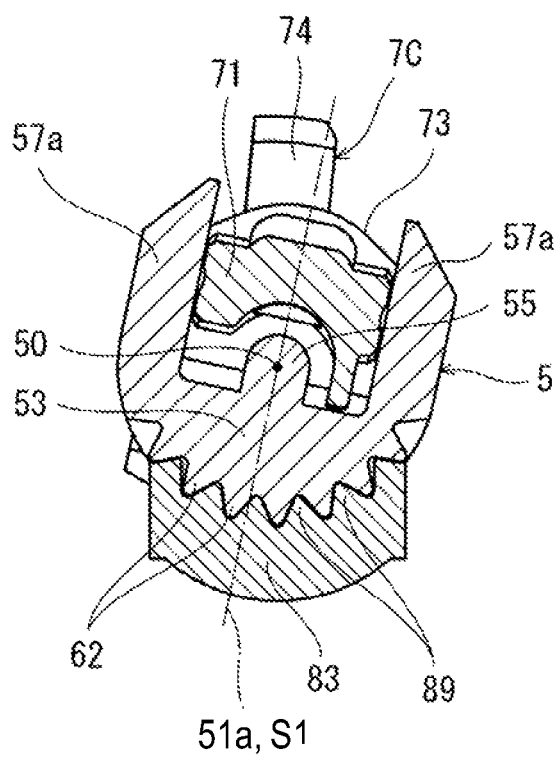
FIG. 13B is a cross-sectional view showing an engaged state between an inward engagement portion and an outward engagement portion in a state in which the sensor holder whose orientation is inverted with respect to the attachment member is coupled to the attachment member at the reference angular position.

In the first posture, the sensor lever 7A is used in a case where the sensor attachment angle is −12 degrees as shown in FIGS. 4 and 10B, the sensor lever 7B is used in a case where the sensor attachment angle is −30 degrees as shown in FIGS. 11A and 11B, and the sensor lever 7C is used in a case where the sensor attachment angle is 6 degrees as shown in FIGS. 12A and 12B. In the second posture, the sensor lever 7C is used in a case where the sensor attachment angle is 12 degrees as shown in FIGS. 13A and 13B, and dedicated sensor levers are also used in a case where the sensor attachment angle is −6 degrees and 30 degrees, although not shown.

Each of the sensor levers 7A, 7B, and 7C includes a hollow fulcrum portion 71 through which a swing shaft 42 (see FIG. 5) penetrates, an arm portion 72 extending in the front-rear direction from the fulcrum portion 71, a dish portion 73 that is provided at a distal end of the arm portion 72 and that covers the inertial mass body 41 on a side opposite to the placement surface 51, and an engagement claw 74 protruding upward from the dish portion 73.

More specifically, in any of the sensor levers 7A, 7B, and 7C, a center line of the engagement claw 74 is substantially parallel to a perpendicular line, that is, the side plate 21, of an upper surface of the base 81 of the attachment member 8, in order to enable the engagement claw 74 to be engaged with the external teeth of the clutch 35. A distal end of the engagement claw 74 is curved. In the present embodiment, a sensor lever including the engagement claw 74 can be used as long as the center line of the engagement claw 74 is within a range of 3 degrees with respect to the perpendicular line of the upper surface of the base 81 of the attachment member 8. In the present embodiment, the angular difference between the adjacent angular positions exceeds a range in which the sensor lever can be used, and thus, as described above, in a case where the sensor attachment angle is changed in each of the first posture and the second posture, it is necessary to rearrange the sensor lever.

The sensor holder 5 includes a first support portion 58 configured to swingably support the sensor lever (7A, 7B, or 7C) in the first posture, and a second support portion 57 configured to swingably support the sensor lever (the sensor lever 7C at the reference angular position) in the second posture. The second support portion 57 is located on a side opposite to the first support portion 58 with respect to the center line 51a of the placement surface 51.

In the present embodiment, the first support portion 58 includes a pair of posts 58a that protrude, from both end portions of the second side wall 54, in parallel to the center line 51a of the placement surface 51, and the second support portion 57 includes a pair of posts 57a that protrude, from both end portions of the first side wall 53, in parallel to the center line 51a of the placement surface 51. That is, the first support portion 58 and the second support portion 57 are separated from each other in the front-rear direction.

As shown in FIG. 5, both posts 58a are provided with fitting holes 58b fitted with both end portions of the swing shaft 42 in the first posture, and both posts 57a are provided with fitting holes 57b fitted with both end portions of the swing shaft 42 in the second posture.

A shape of the sensor holder 5 is asymmetric with respect to a plane S2 that is perpendicular to a direction in which the first support portion 58 and the second support portion 57 are separated from each other (the front-rear direction in the present embodiment), and that includes the center line 51a of the placement surface 51. In the present embodiment, the first support portion 58 and the second support portion 57 have different heights from the placement surface 51 in a direction along the center line 51a. A height of the first support portion 58 is smaller than a height of the second support portion 57.

As described above, in the seat belt retractor 1 of the present embodiment, the sensor attachment angles are different between the state in which the sensor holder 5 is in the first posture and the state in which the sensor holder 5 is in the second posture, and thus, it is possible to increase the number of the sensor attachment angles adjusted by one sensor holder 5 as compared with the related art. Therefore, in a case where the sensor attachment angle can be adjusted in a predetermined angle range (for example, a range of +30 degrees), the number of sensor holders to be prepared can be reduced.

For example, in a case where a sensor holder that can be replaced with the sensor holder 5 and that has a sensor attachment angle of −3 degrees at the reference angular position is prepared, the sensor attachment angle can be adjusted to any one of −21 degrees, −3 degrees, and 15 degrees in the first posture, and the sensor attachment angle can be adjusted to any one of 3 degrees, 21 degrees, and −15 degrees in the second posture.

In the present embodiment, since the orientation, with respect to the attachment member 8, of the sensor holder 5 is inverted, it is possible to select whether the sensor holder 5 is in the first posture or the second posture, depending on the orientation of the sensor holder 5 coupled to the attachment member 8.

Further, in the present embodiment, since each of the first outward engagement portion 61 and the second outward engagement portion 63 is asymmetric with respect to the plane S1 including the rotation axis 50 and the center line 51a of the placement surface 51, the attachment member 8 can have a simple shape symmetrical with respect to a plane that is parallel to the side plate 21 of the housing 2 and includes the rotation axis 50.

In the present embodiment, since the sensor holder 5 includes the first support portion 58 configured to support the sensor lever (7A, 7B, or 7C) in the first posture, and the second support portion 57 configured to support the sensor lever (the sensor lever 7C at the reference angular position) in the second posture, the sensor lever in the first posture and the sensor lever in the second posture can be designed in the same direction.

Further, in the present embodiment, since the shape of the sensor holder 5 is asymmetric with respect to the plane S2 between the first support portion 58 and the second support portion 57, it is possible to determine whether the sensor holder 5 is in the first posture or the second posture only by looking at the sensor holder 5.

In addition, since the first support portion 58 and the second support portion 57 have different heights, it is possible to easily determine whether the sensor holder 5 is in the first posture or the second posture.

MODIFICATION

The present disclosure is not limited to the above embodiment, and various modifications can be made without departing from the gist of the disclosure.

For example, although the attachment member 8 is attached to the side plate 21 of the housing 2 via the mechanism cover 11 in the above embodiment, the attachment member 8 may be directly attached to the side plate 21. Further, the attachment member 8 may be provided integrally with the mechanism cover 11.

The sensor holder 5 does not necessarily have to include two support portions 57 and 58, and may include one support portion configured to swingably support a sensor lever in either the first posture or the second posture.

The shaft portions 55 and 56 and the grip portions 84 and 85 may be omitted, and the inward engagement portions 86 and 88 and the outward engagement portions 61 and 63 may be bonded or welded to each other after the outward engagement portions 61 and 63 of the sensor holder 5 are engaged with the inward engagement portions 86 and 88 of the attachment member 8 in the first posture or the second posture.

In a case where a sensor attachment angle is adjusted in each of the first posture and the second posture such that an angular difference between the adjacent angular positions does not exceed a range in which the same sensor lever can be used, it may be unnecessary to rearrange the sensor lever.

Figure 15A:
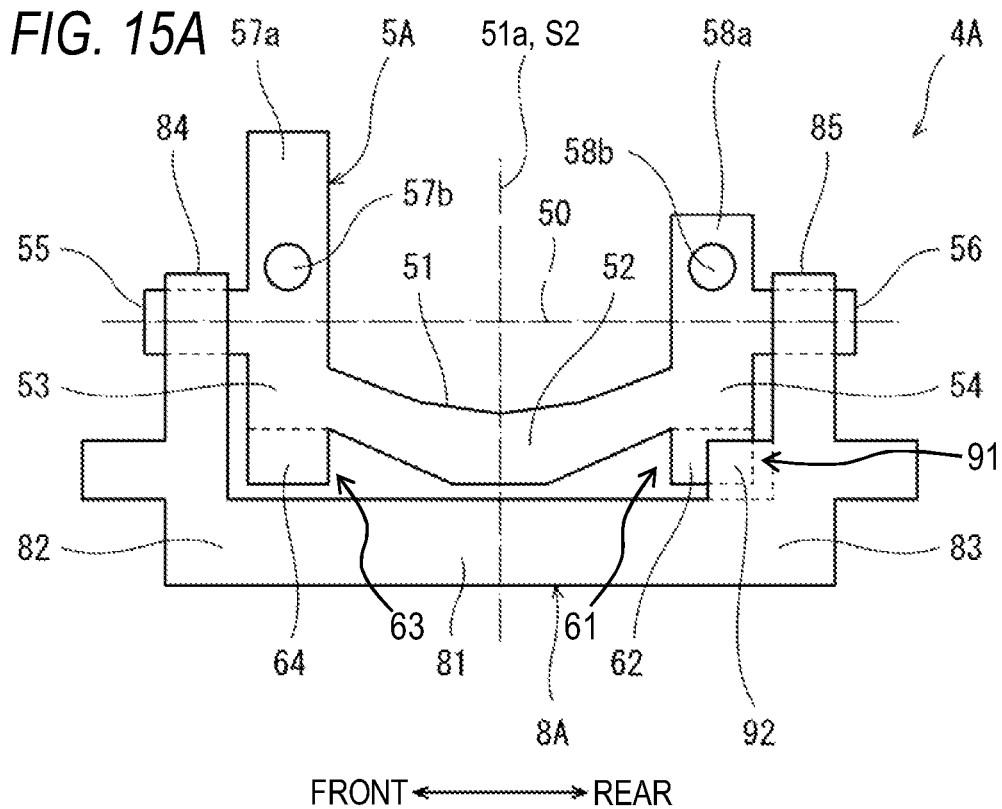
FIG. 15A schematically shows a state before reversing a sensor holder in a vehicle acceleration sensor according to a first modification.
Figure 15A:
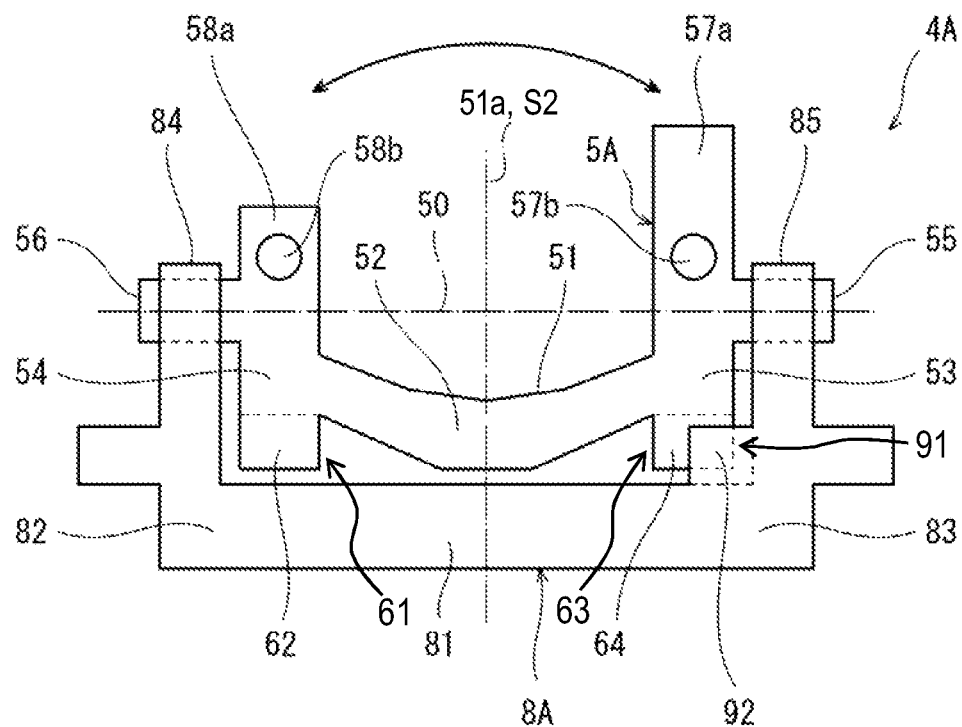
Figures 16A, 16B:
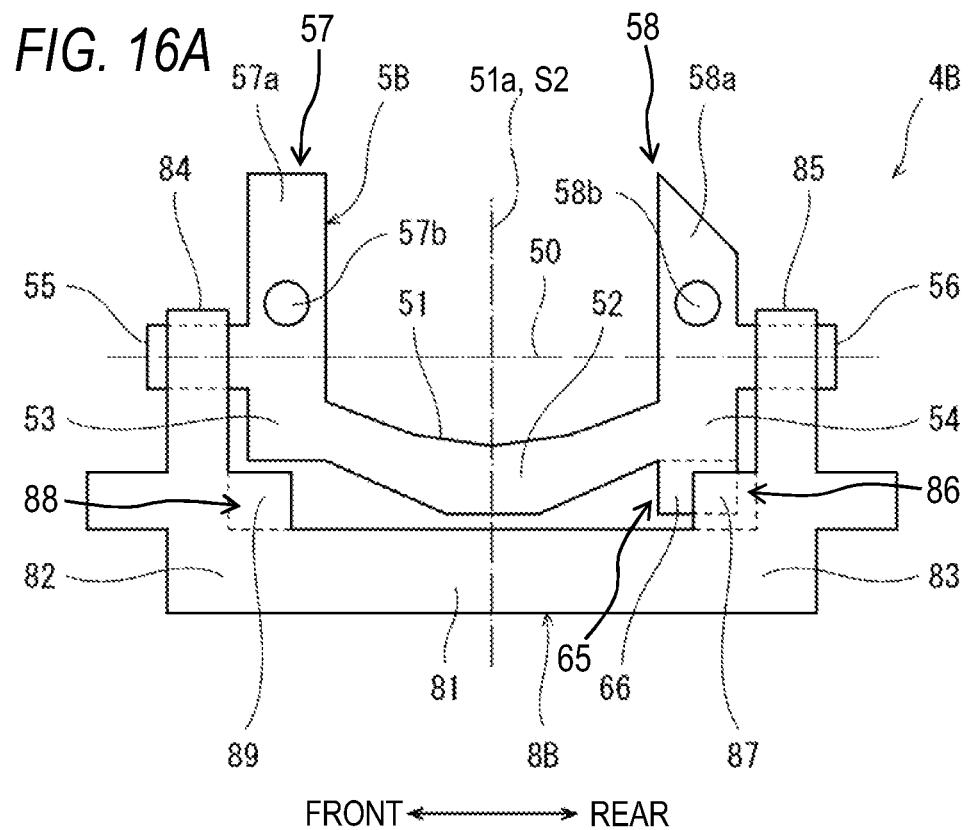
FIG. 16A schematically shows a state before reversing a sensor holder in a vehicle acceleration sensor according to a second modification.
FIG. 16B schematically shows a state after reversing the sensor holder in a vehicle acceleration sensor according to the second modification.
Figure 17A:
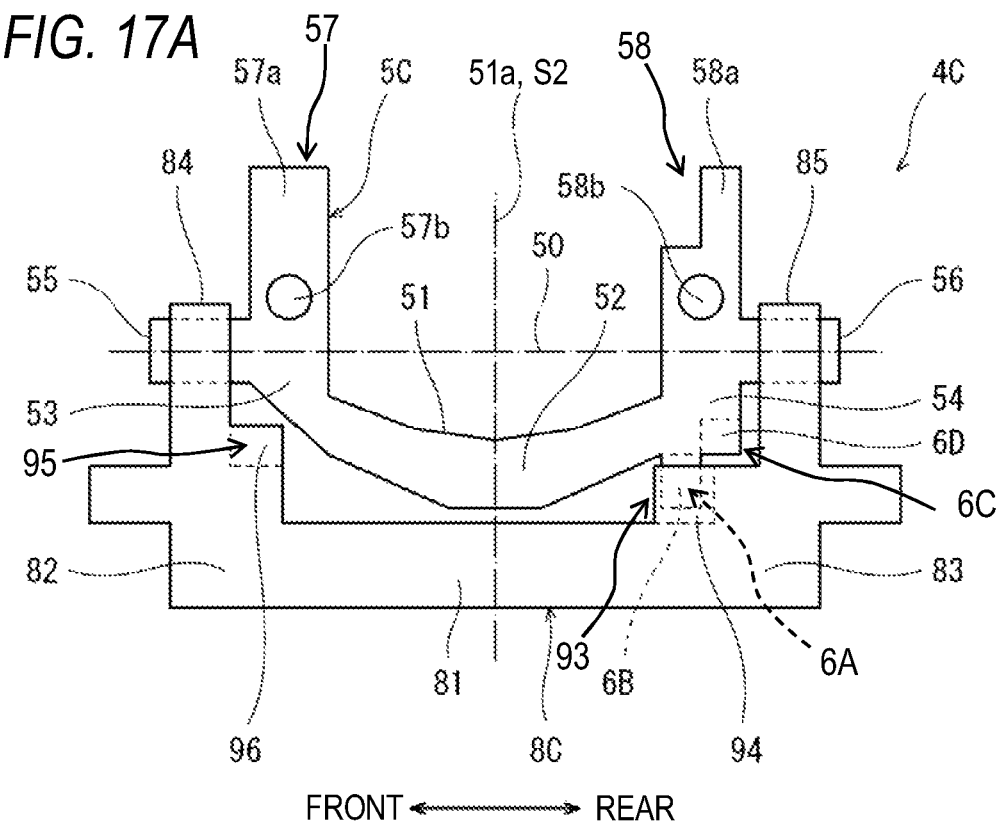
FIG. 17A schematically shows a state before reversing a sensor holder in a vehicle acceleration sensor according to a third modification.
Figure 17B:
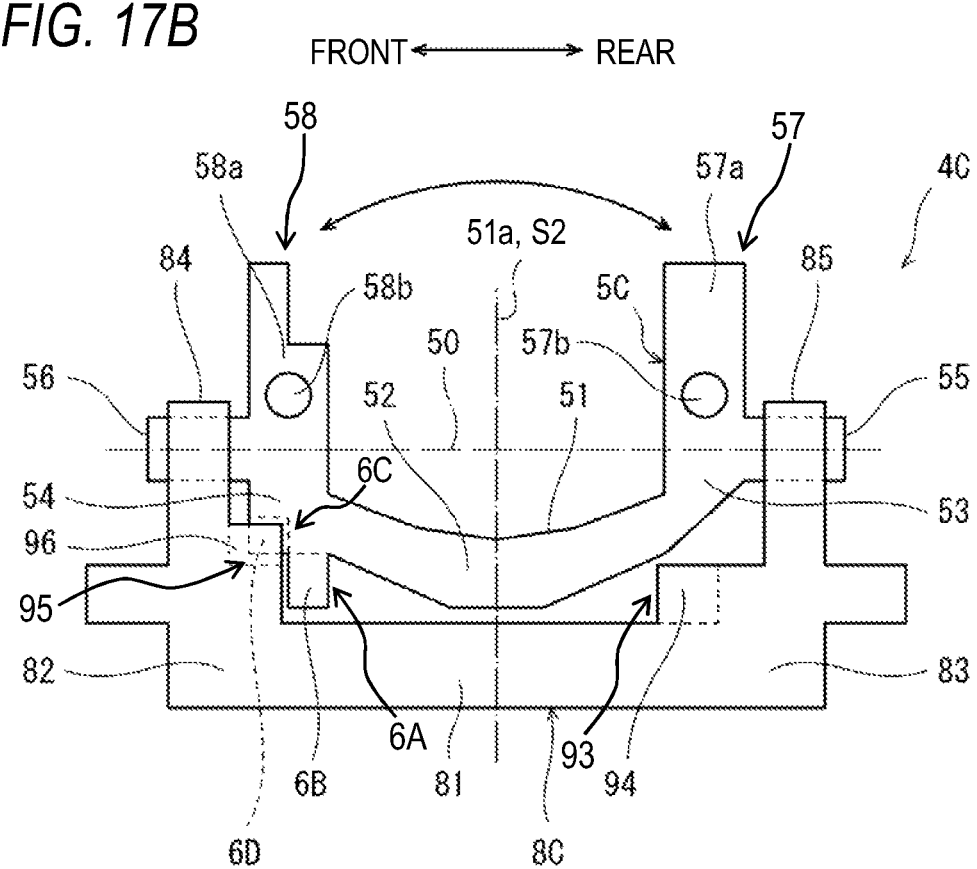
FIG. 17B schematically shows a state after reversing the sensor holder in the vehicle acceleration sensor according to the third modification.

Further, a vehicle acceleration sensor 4A according to a first modification shown in FIGS. 15A and 15B may be adopted, a vehicle acceleration sensor 4B according to a second modification shown in FIGS. 16A and 16B may be adopted, or a vehicle acceleration sensor 4C according to a third modification shown in FIGS. 17A and 17B may be adopted.

The vehicle acceleration sensor 4A, according to the first modification shown in FIGS. 15A and 15B, includes an attachment member 8A that has a configuration similarly to the attachment member 8 of the above embodiment except for including one inward engagement portion 91, and includes a sensor holder 5A that has a configuration similarly to the sensor holder 5 of the above embodiment except for the first outward engagement portion 61 and the second outward engagement portion 63.

Also in the vehicle acceleration sensor 4A, by reversing an orientation of the sensor holder 5A coupled to the attachment member 8A, the sensor holder 5A is in either a first posture shown in FIG. 15A or a second posture shown in FIG. 15B, as in the above embodiment.

The inward engagement portion 91 includes at least one inward protrusion 92 that is pointed radially inward about the rotation axis 50, similarly to the inward engagement portions 86 and 88 of the above embodiment. In the first modification, the inward engagement portion 91 is provided on the second end portion 83 of the attachment member 8, the first outward engagement portion 61 is provided on a second side wall 54 of the sensor holder 5A, and the second outward engagement portion 63 is provided on a first side wall 53 of the sensor holder 5A. Therefore, the first outward engagement portion 61 is engaged with the inward engagement portion 91 in the first posture, and the second outward engagement portion 63 is engaged with the inward engagement portion 91 in the second posture.

The inward engagement portion 91 may be provided on the first end portion 82 of the attachment member 8, the first outward engagement portion 61 may be provided on a first side wall 53 of the sensor holder 5A, and the second outward engagement portion 63 may be provided on a second side wall 54 of the sensor holder 5A.

As in the above embodiment, the number of the inward protrusions 92 and the number of the outward protrusions 62 and 64 may be plural. Alternatively, the number of inward protrusions 92 may be plural, and the number of outward protrusions 62 and 64 may be one. Conversely, the number of the outward protrusions 62 and 64 may be plural, and the number of the inward protrusions 92 may be one. In the first modification, each of the first outward engagement portion 61 and the second outward engagement portion 63 may be asymmetric with respect to the plane S1 including the rotation axis 50 and the center line 51a of the placement surface 51, as in the above embodiment.

In the above embodiment, as shown in FIGS. 10A and 10B, in the first outward engagement portion 61 and the second outward engagement portion 63, positions of the outward protrusions 62 and 64 are the same when viewed from an extending direction of the rotation axis 50. In the present embodiment, the first outward engagement portion 61 and the second outward engagement portion 63 are different in positions of the outward protrusions 62 and 64 in the circumferential direction around the rotation axis 50 when viewed from the extending direction of the rotation axis 50. Therefore, a plurality of sensor attachment angles corresponding to a plurality of angular positions in a case where the sensor holder 5A is coupled to the attachment member 8A are different between the first posture and the second posture.

Also in the first modification, it is possible to increase the number of the sensor attachment angles adjusted by one sensor holder 5A as compared with the related art, as in the above embodiment. In addition, in the first modification, the plurality of sensor attachment angles can be easily set depending on a difference in position between the outward protrusion 62 of the first outward engagement portion 61 and the outward protrusion 64 of the second outward engagement portion 63.

The vehicle acceleration sensor 4B, according to the second modification shown in FIGS. 16A and 16B, includes a sensor holder 5B that has a configuration similarly to the sensor holder 5 of the above embodiment except for including one outward engagement portion 65, and includes an attachment member 8B that has a configuration similarly to the attachment member 8 of the above embodiment except for the first inward engagement portion 86 and the second inward engagement portion 88.

Also in the vehicle acceleration sensor 4B, by reversing an orientation of the sensor holder 5B coupled to the attachment member 8B, the sensor holder 5B is in either a first posture shown in FIG. 16A or a second posture shown in FIG. 16B, as in the above embodiment.

The outward engagement portion 65 includes at least one outward protrusion 66 that is pointed radially outward about the rotation axis 50, similarly to the outward engagement portions 61 and 63 of the above embodiment. In the second modification, the outward engagement portion 65 is provided on a second side wall 54 of the sensor holder 5B, the first inward engagement portion 86 is provided on a second end portion 83 of the attachment member 8B, and the second inward engagement portion 88 is provided on a first end portion 82 of the attachment member 8B. Therefore, the first inward engagement portion 86 is configured to be engaged with the outward engagement portion 65 in the first posture, and the second inward engagement portion 88 is configured to be engaged with the outward engagement portion 65 in the second posture.

The outward engagement portion 65 may be provided on a first side wall 53 of the sensor holder 5B, the first inward engagement portion 86 may be provided on a first end portion 82 of the attachment member 8B, and the second inward engagement portion 88 may be provided on a second end portion 83 of the attachment member 8B.

As in the above embodiment, the number of the outward protrusions 66 and the number of the inward protrusions 87 and 89 may be plural. Alternatively, the number of the outward protrusions 66 may be plural, and the number of the inward protrusions 87 and 89 may be one. Conversely, the number of inward protrusions 87 and 89 may be plural, and the number of outward protrusions 66 may be one. In the second modification, the outward engagement portion 65 may be asymmetric with respect to the plane S1 including the rotation axis 50 and the center line 51a of the placement surface 51, as in the above embodiment.

In the above embodiment, as shown in FIGS. 10A and 10B, in the first inward engagement portion 86 and the second inward engagement portion 88, positions of the inward protrusions 87 and 89 are the same when viewed from the extending direction of the rotation axis 50. In the present embodiment, the first inward engagement portion 86 and the second inward engagement portion 88 are different in positions of the inward protrusions 87 and 89 in the circumferential direction around the rotation axis 50 when viewed from the extending direction of the rotation axis 50. Therefore, a plurality of sensor attachment angles corresponding to a plurality of angular positions in a case where the sensor holder 5B is coupled to the attachment member 8B are different between the first posture and the second posture.

Also in the second modification, it is possible to increase the number of the sensor attachment angles adjusted by one sensor holder 5B as compared with the related art, as in the above embodiment. In addition, in the present embodiment, the plurality of sensor attachment angles can be easily set depending on a difference in position between the inward protrusion 87 of the first inward engagement portion 86 and the inward protrusion 89 of the second inward engagement portion 88.

In the second modification, since a distal end of the first support portion 58 is inclined and a distal end of the second support portion 57 is flat, a shape of the sensor holder 5B is asymmetric with respect to the plane S2 that is perpendicular to a direction in which the first support portion 58 and the second support portion 57 are separated from each other and that includes the center line 51a of the placement surface 51.

The vehicle acceleration sensor 4C, according to the third modification shown in FIGS. 17A and 17B, includes an attachment member 8C that has a configuration similarly to the attachment member 8 of the above embodiment except for a first inward engagement portion 93 and a second inward engagement portion 95, and includes a sensor holder 5C that has a configuration similarly to the sensor holder 5 of the above embodiment except for a first outward engagement portion 6A and a second outward engagement portion 6C.

Also in the vehicle acceleration sensor 4C, by reversing an orientation of the sensor holder 5C coupled to the attachment member 8C, the sensor holder 5C is in either a first posture shown in FIG. 17A or a second posture shown in FIG. 17B, as in the above embodiment.

The first inward engagement portion 93 and the second inward engagement portion 95 respectively include at least one inward protrusion 94 and at least one inward protrusion 96 that are pointed radially inward about the rotation axis 50, similarly to the inward engagement portions 86 and 88 of the above embodiment. In the present embodiment, the first inward engagement portion 93 is located outward of the second inward engagement portion 95 in a radial direction about the rotation axis 50.

The first outward engagement portion 6A and the second outward engagement portion 6C respectively include at least one outward protrusion 6B and at least one outward protrusion 6D that are pointed radially outward about the rotation axis 50, similarly to the outward engagement portions 61 and 63 of the above embodiment. In the present embodiment, the first outward engagement portion 6A is located outward of the second outward engagement portion 6C in the radial direction about the rotation axis 50.

In the third modification, the first outward engagement portion 6A and the second outward engagement portion 6C are provided on a second side wall 54 of the sensor holder 5C, the first inward engagement portion 93 is provided on a second end portion 83 of the attachment member 8C, and the second inward engagement portion 95 is provided on a first end portion 82 of the attachment member 8C.

The first outward engagement portion 6A is configured to be engaged with the first inward engagement portion 93 in the first posture, is configured not to be engaged with the second inward engagement portion 95 in the first posture, and is configured not to be engaged with the first inward engagement portion 93 and the second inward engagement portion 95 in the second posture. The second outward engagement portion 6C is configured not to be engaged with the first inward engagement portion 93 and the second inward engagement portion 95 in the first posture, is configured to be engaged with the second inward engagement portion 95 in the second posture, and is configured not to be engaged with the first inward engagement portion 93 in the second posture.

The positions at which the first outward engagement portion 6A and the second outward engagement portion 6C, and the first inward engagement portion 93 and the second inward engagement portion 95 are provided are not limited to the positions shown in FIGS. 17A and 17B, and can be changed as appropriate. In the third modification, each of the first outward engagement portion 6A and the second outward engagement portion 6C may be asymmetric with respect to the plane S1 including the rotation axis 50 and the center line 51a of the placement surface 51, as in the above embodiment.

As in the above embodiment, the number of the outward protrusions 6B and 6D, and the number of the inward protrusions 94 and % may be plural. Alternatively, the number of the outward protrusions 6B and 6D may be plural, and the number of the inward protrusions 94 and 96 may be one. Conversely, the number of inward protrusions 94 and 96 may be plural, and the number of outward protrusions 6B and 6D may be one.

Also in the third modification, a plurality of sensor attachment angles corresponding to a plurality of angular positions in a case where the sensor holder 5C is coupled to the attachment member 8C are different between the first posture and the second posture, as in the above embodiment. Therefore, it is possible to increase the number of sensor attachment angles adjusted by one sensor holder 5C as compared with the related art. In addition, in the present embodiment, a first engagement structure of the first inward engagement portion 93 and the first outward engagement portion 6A, and a second engagement structure of the second inward engagement portion 95 and the second outward engagement portion 6C can be different from each other. For example, the outward protrusion and the inward protrusion may be different in size and pitch between the first engagement structure and the second engagement structure.

In the third modification, a width of a distal end of the first support portion 58 is smaller than a thickness of the second side wall 54, and a width of a distal end of the second support portion 57 is equal to a thickness of the first side wall 53, and thus a shape of the sensor holder 5C is asymmetric with respect to the plane S2 that is perpendicular to a direction in which the first support portion 58 and the second support portion 57 are separated from each other and that includes the center line 51a of the placement surface 51.

In the above embodiment, the orientation of the sensor holder 5 coupled to the attachment member 8 can be inverted. However, the orientation of the sensor holder 5 coupled to the attachment member 8 cannot be inverted, and by reversing an orientation of the attachment member 8 with respect to the housing 2, the attachment member 8 may be attached to the housing 2 either in a state in which the sensor holder 5 is in the first posture or in a state in which the sensor holder 5 is in the second posture. With this configuration, it is possible to select whether the sensor holder is in the first posture or the second posture depending on the orientation of the attachment member 8 attached to the housing 2. Also in this case, for example, in a case where each of the first outward engagement portion 61 and the second outward engagement portion 63 is asymmetric with respect to the plane S1 including the rotation axis 50 and the center line 51a of the placement surface 51, or in a case where each of the first inward engagement portion 86 and the second inward engagement portion 88 is asymmetric with respect to the plane parallel to the side plate 21 of the housing 2 and including the rotation axis 50, the plurality of sensor attachment angles are different between the state in which the sensor holder 5 is in the first posture and the state in which the sensor holder 5 is in the second posture.

In order to make the orientation of the sensor holder 5 coupled to the attachment member 8 irreversible, for example, diameters of the first shaft portion 55 and the second shaft portion 56 may be different from each other. In a case where the orientation of the attachment member 8 attached to the housing 2 can be inverted, the attachment member 8 may include only one inward engagement portion, and the sensor holder 5 may include only one outward engagement portion.

Figure 18:
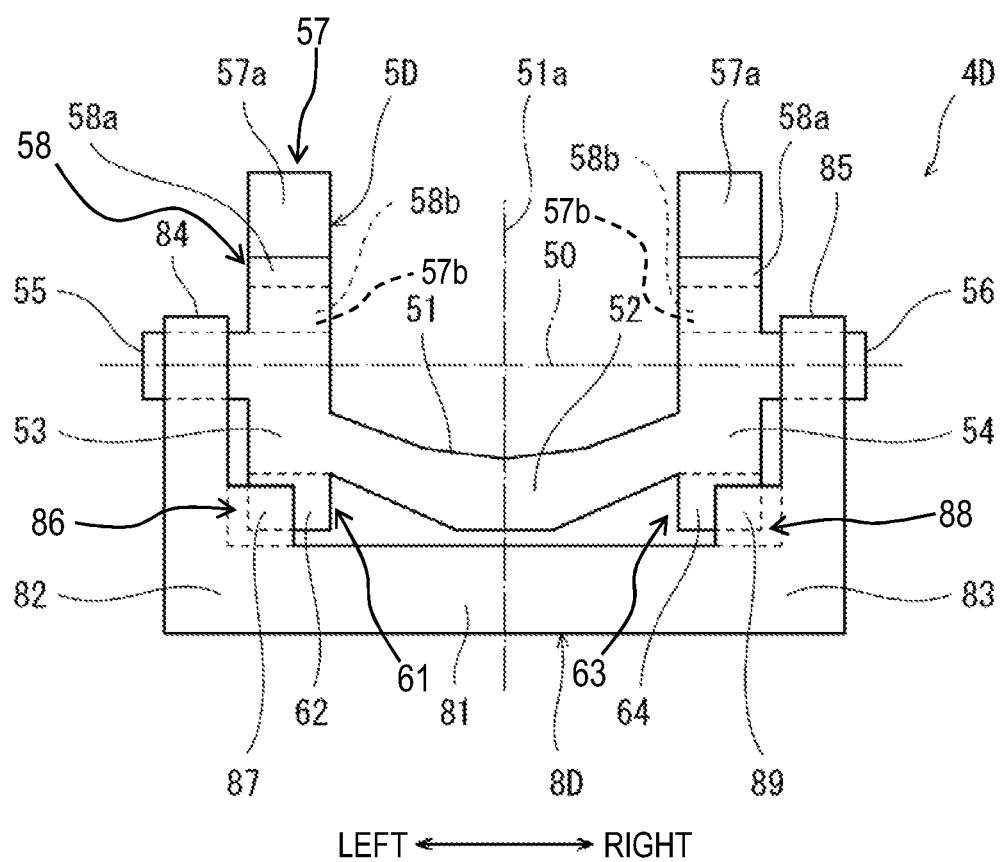
FIG. 18 schematically shows a sensor holder in a vehicle acceleration sensor according to a fourth modification.
Figure 19:
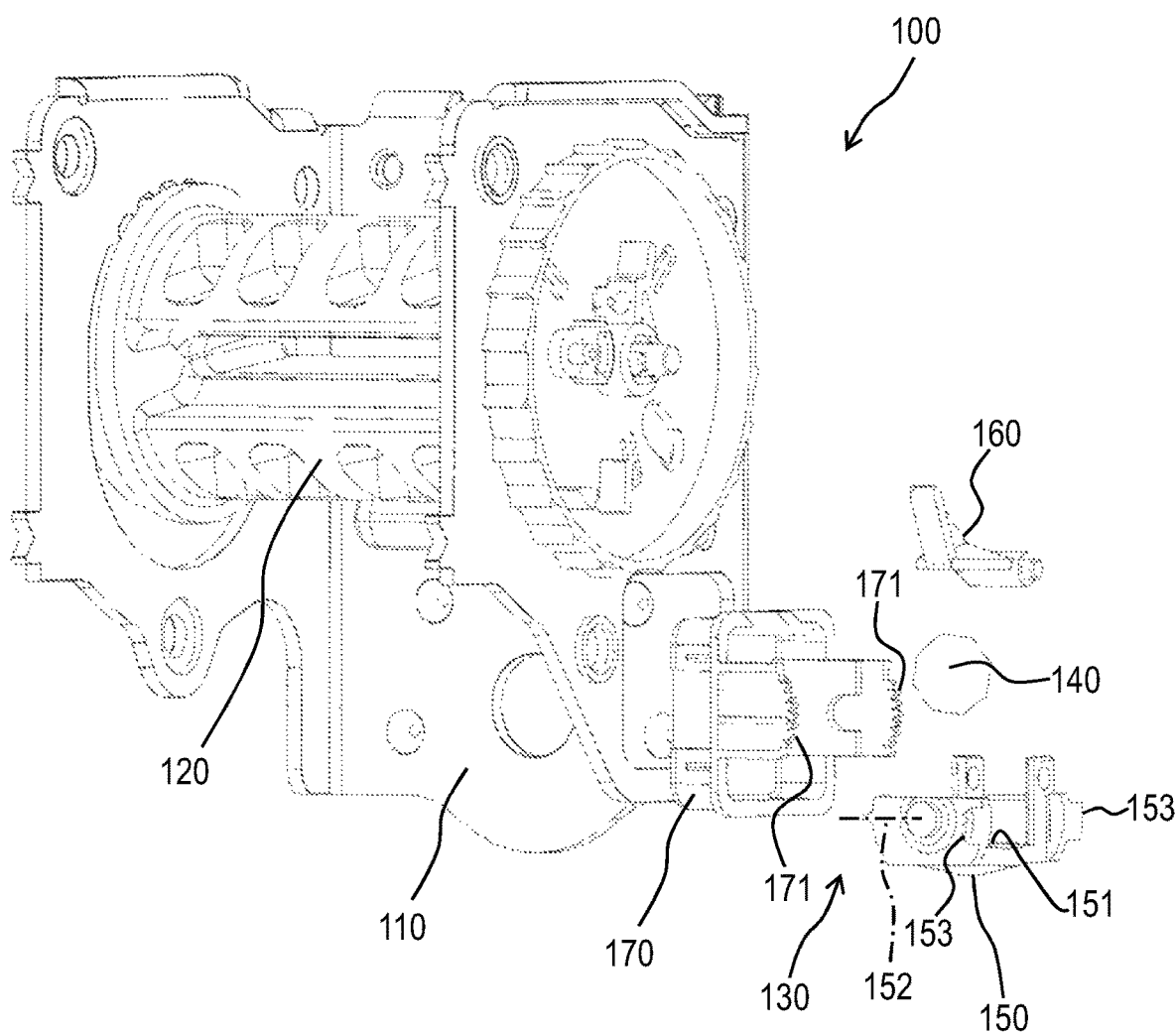
FIG. 19 is a perspective view of a seat belt retractor in the related art.

In the above embodiment, the orientation of the sensor holder 5 is adjusted along the plane parallel to the back plate 23 of the housing 2. However, in a case where the seat belt retractor 1 is inclined while the axial direction of the winding drum 3 is kept horizontal, the inclination of the sensor holder 5, that is, the inclination of the center line 51a of the placement surface 51 with respect to the back plate 23 of the housing 2 may be adjusted along the plane (here, the side plate 21) orthogonal to the axial direction of the winding drum 3. That is, as in a vehicle acceleration sensor 4D according to a fourth modification shown in FIG. 18, a rotation axis 50 of the sensor holder 5D may extend in the left-right direction. Note that, FIG. 18 is a view of the vehicle acceleration sensor 4D in the first posture as viewed from the rear.

In this case, a first side wall 53 and a second side wall 54 of the sensor holder 5D are located on both sides of the first support portion 52 in the left-right direction, and a first end portion 82 and a second end portion 83 of the attachment member 8D are located on both sides of the base 81 in the left-right direction. The pair of posts 58a of the first support portion 58 configured to swingably support a sensor lever (not shown) in the first posture are provided at rear end portions of both the first side wall 53 and the second side wall 54. The pair of posts 57a of the second support portion 57 configured to swingably support a sensor lever (not shown) in the second posture are provided at front end portions of both the first side wall 53 and the second side wall 54. The sensor lever may be the same as or different from the sensor lever used in the first posture as in the embodiment. Therefore, the fitting holes 57b and 58b provided in the posts 57a and 58a are parallel to the rotation axis 50. That is, the swing shaft 42 is attached to the sensor holder 5D in a state in which a longitudinal direction of the swing shaft 42 is parallel to the rotation axis 50.

Also in the fourth modification, by reversing the orientation of the sensor holder 5D coupled to the attachment member 8D, the sensor holder 5D is in either the first orientation or the second orientation. As in the above embodiment, the plurality of sensor attachment angles are different between the state in which the sensor holder 5D is in the first posture and the state in which the sensor holder 5D is in the second posture, and thus it is possible to increase the number of the sensor attachment angles handled by one sensor holder 5D as compared with the related art.

Also in the sensor holder 5D according to the fourth modification, similarly to the sensor holder 5 of the above embodiment, the height of the first support portion 58 is smaller than the height of the second support portion 57 in the direction along the center line 51a from the placement surface 51, and thus, a shape of the sensor holder 5D is asymmetric with respect to the plane S2 that is perpendicular to the direction, which is the front-rear direction in the present embodiment, in which the first support portion 58 and the second support portion 57 are separated from each other and that includes the center line 51a of the placement surface 51. Note that, only distal ends of the pair of posts 57a of the second support portion 57 are seen in FIG. 18.

What is claimed is:
1. A seat belt retractor comprising:
   a vehicle acceleration sensor configured to be in a detection state in a case where an acceleration of a vehicle is equal to or greater than a predetermined value; and
   a winding drum accommodated, in a housing, to be rotatable in a pull-out direction and a winding direction of a webbing, the winding drum being configured not to rotate in the pull-out direction in a case where the vehicle acceleration sensor is in the detection state,
   wherein the vehicle acceleration sensor includes:
      an inertial mass body having a spherical shape;
      a sensor holder including a placement surface having a mortar shape and a cross-sectional shape symmetrical with respect to a center line of the placement surface, the inertial mass body being placed on the placement surface;
      a sensor lever swingably supported by the sensor holder, the sensor lever being pushed up by the inertial mass body rolling on the placement surface in a case where the acceleration of the vehicle is equal to or greater than the predetermined value; and
      an attachment member to which the sensor holder is coupled and which is attached to the housing,
   the attachment member is attached to the housing in a state in which the sensor holder is in either a first posture or a second posture inverted about the center line of the placement surface with respect to the first posture,
   the sensor holder is configured to be coupled to the attachment member at any one of a plurality of angular positions in each of the first posture and the second posture, the plurality of angular positions being positions of the sensor holder in a case where the sensor holder rotates around a rotation axis extending in a direction orthogonal to the center line of the placement surface, and
   a plurality of sensor attachment angles corresponding to the plurality of angular positions are different between the first posture and the second posture, the plurality of sensor attachment angles being angles, with respect to the housing, of the center line of the placement surface.
2. The seat belt retractor according to claim 1,
   wherein the sensor holder is provided with an outward engagement portion including at least one outward protrusion that is pointed radially outward about the rotation axis,
   the attachment member is provided with an inward engagement portion including at least one inward protrusion that is pointed radially inward about the rotation axis, the inward engagement portion being configured to engage with the outward engagement portion, one or both of the at least one outward protrusion and the at least one inward protrusion are provided in plural and arranged in a circumferential direction around the rotation axis, and the sensor holder is configured to be coupled to the attachment member at any one of the plurality of angular positions in accordance with a change of an engaged state between the outward engagement portion and the inward engagement portion.

3. The seat belt retractor according to claim 2, wherein the sensor holder is configured to be in either the first posture or the second posture by inverting an orientation of the sensor holder in a case where the sensor holder is coupled to the attachment member, and the outward engagement portion and the inward engagement portion are configured to be engaged with each other in both the first posture and the second posture.

4. The seat belt retractor according to claim 3, wherein the number of portions of the inward engagement portion is one, the outward engagement portion includes:
  a first outward engagement portion configured to be engaged with the inward engagement portion, in the first posture; and
  a second outward engagement portion configured to be engaged with the inward engagement portion, in the second posture, and the first outward engagement portion and the second outward engagement portion are different in a position of the at least one outward protrusion when viewed from an extending direction of the rotation axis.

5. The seat belt retractor according to claim 3, wherein the number of portions of the outward engagement portion is one, the inward engagement portion includes:
  a first inward engagement portion configured to be engaged with the outward engagement portion, in the first posture; and
  a second inward engagement portion configured to be engaged with the outward engagement portion, in the second posture, and the first inward engagement portion and the second inward engagement portion are different in a position of the at least one inward protrusion when viewed from an extending direction of the rotation axis.

6. The seat belt retractor according to claim 3, wherein the inward engagement portion includes a first inward engagement portion and a second inward engagement portion, the outward engagement portion includes a first outward engagement portion and a second outward engagement portion, the first outward engagement portion is configured:
  to be engaged with the first inward engagement portion, in the first posture;
  not to be engaged with the second inward engagement portion, in the first posture; and
  not to be engaged with the first inward engagement portion and the second inward engagement portion, in the second posture, and the second outward engagement portion is configured:
  not to be engaged with the first inward engagement portion and the second inward engagement portion, in the first posture;
  to be engaged with the second inward engagement portion, in the second posture; and
  not to be engaged with the first inward engagement portion, in the second posture.

7. The seat belt retractor according to claim 2, wherein, by reversing an orientation of the attachment member with respect to the housing, the attachment member is configured to be attached to the housing either in a state in which the sensor holder is in the first posture or in a state in which the sensor holder is in the second posture.

8. The seat belt retractor according to claim 2, wherein the outward engagement portion is asymmetric with respect to a plane including the rotation axis and the center line of the placement surface.

9. The seat belt retractor according to claim 1, wherein the sensor holder includes:
  a first support portion configured to swingably support the sensor lever in the first posture; and
  a second support portion configured to swingably support the sensor lever in the second posture, the second support portion being located on a side opposite to the first support portion with respect to the center line of the placement surface.

10. The seat belt retractor according to claim 9, wherein a shape of the sensor holder is asymmetric with respect to a plane that is perpendicular to a direction in which the first support portion and the second support portion are separated from each other, and that includes the center line of the placement surface.

11. The seat belt retractor according to claim 10, wherein the first support portion of the sensor holder and the second support portion of the sensor holder have different heights, in a direction along the center line of the placement surface, from the placement surface.

* * * * *